Dec. 17, 1929.　　C. HORTON ET AL　　1,740,177
CONDENSER ASSEMBLING MACHINE
Filed Jan. 2, 1925　　14 Sheets-Sheet 1
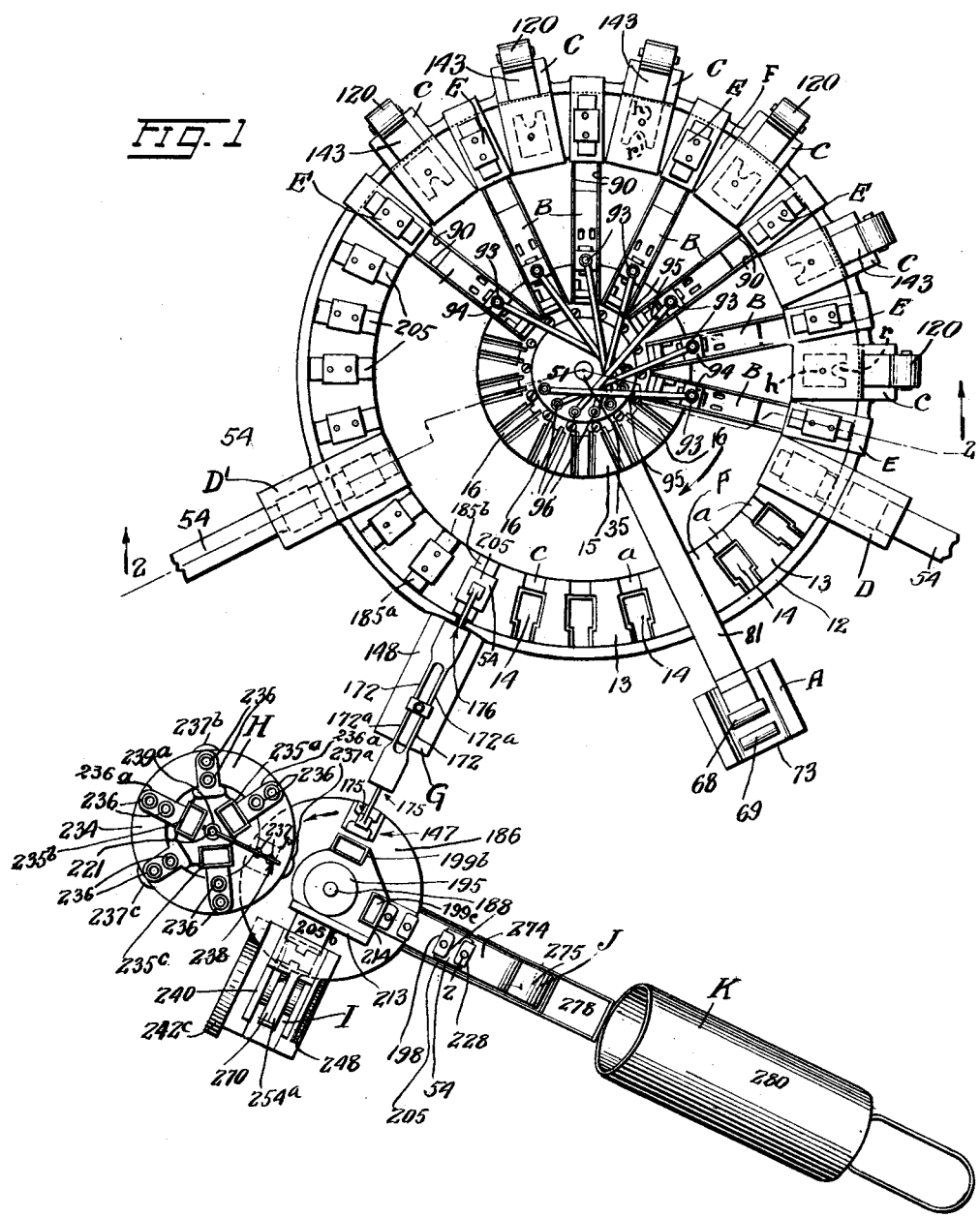
INVENTOR
HARRY R. VAN DEVENTER
CHARLES HORTON
ANATOLE C. HEINY
BY Van Deventer & Nickel
ATTORNEYS

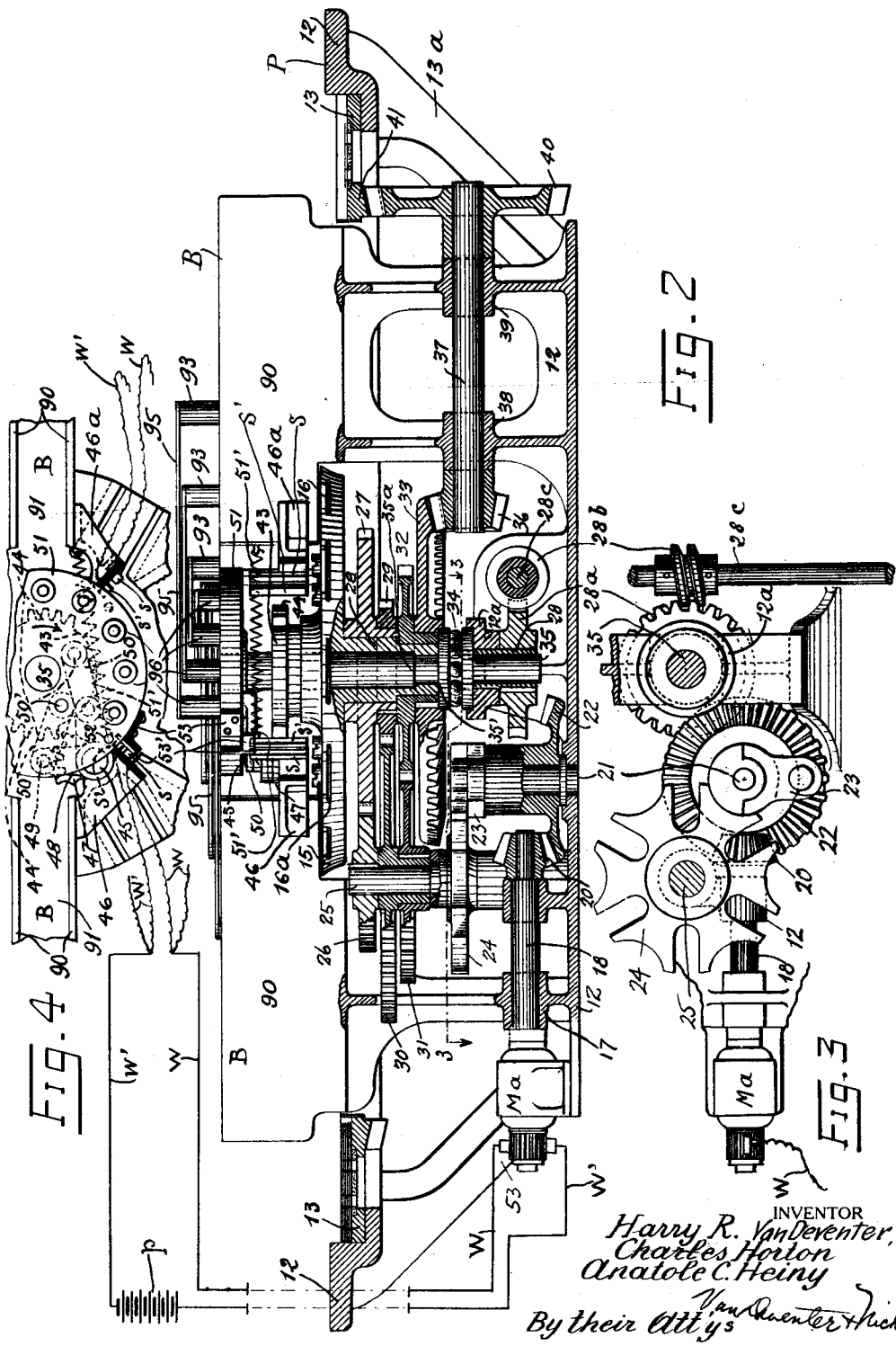

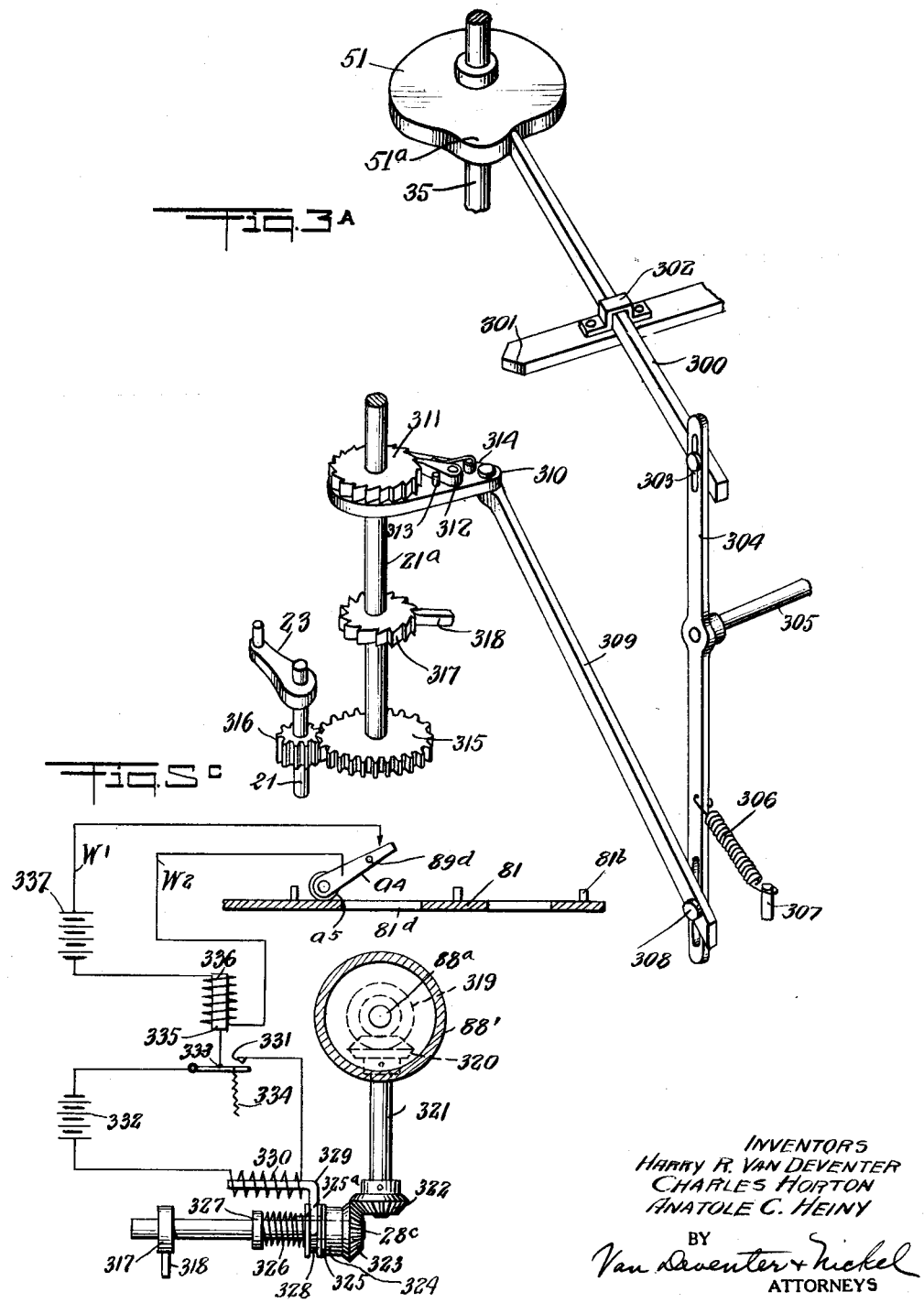

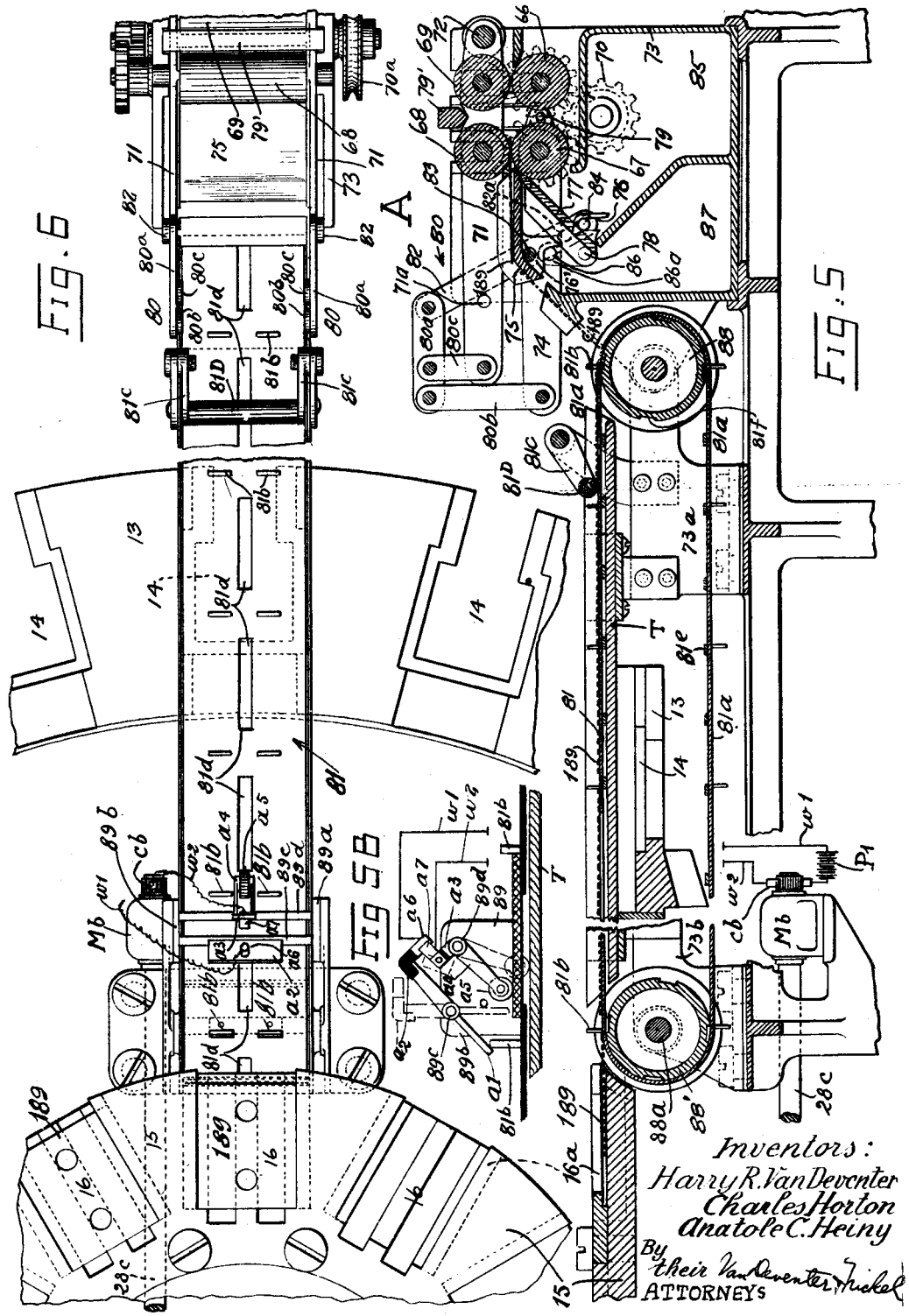

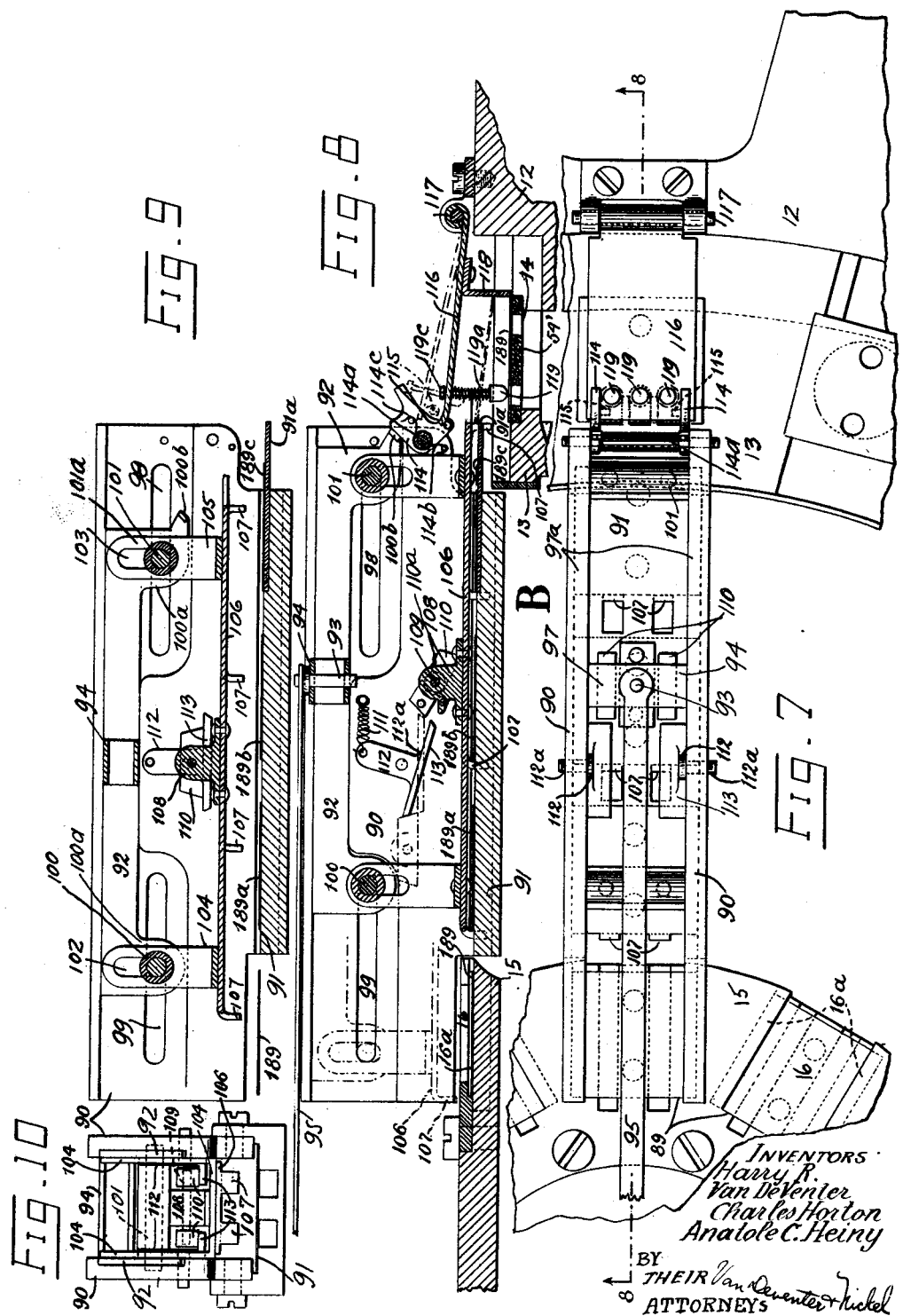

INVENTORS:
Harry R. VanDeventer
Charles Horton
Anatole C. Heiny
By their ATTORNEYS VanDeventer & Nickel

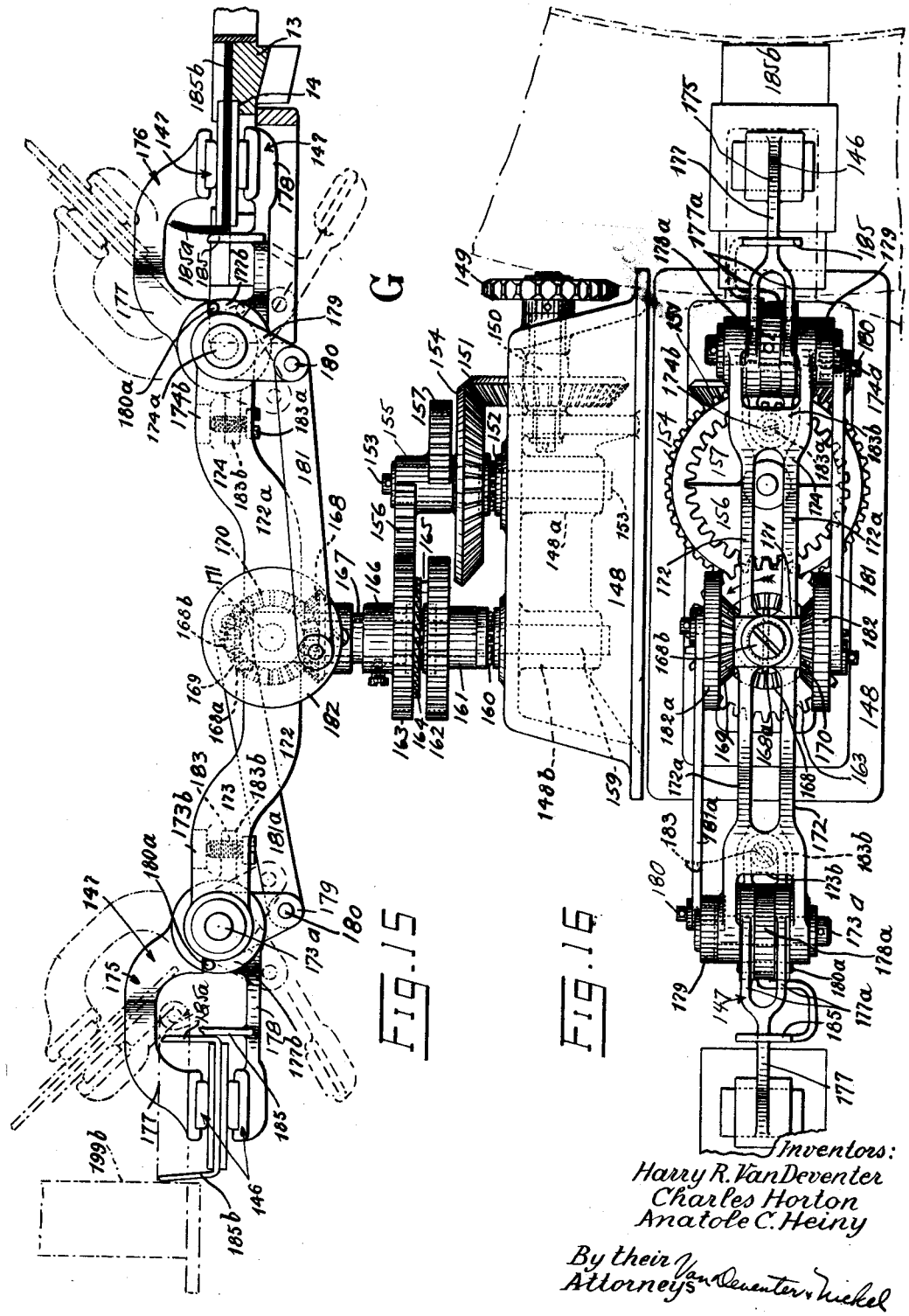

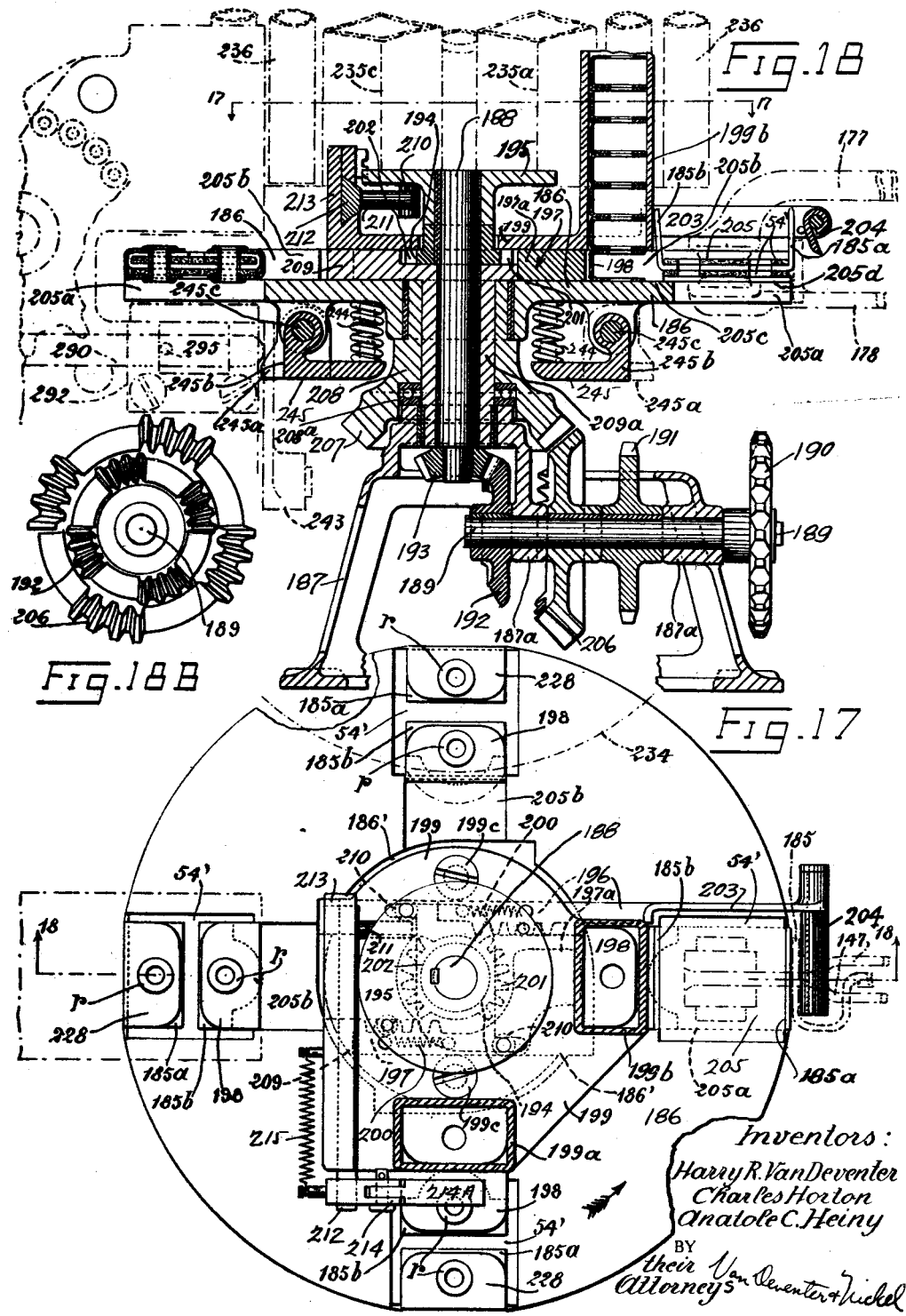

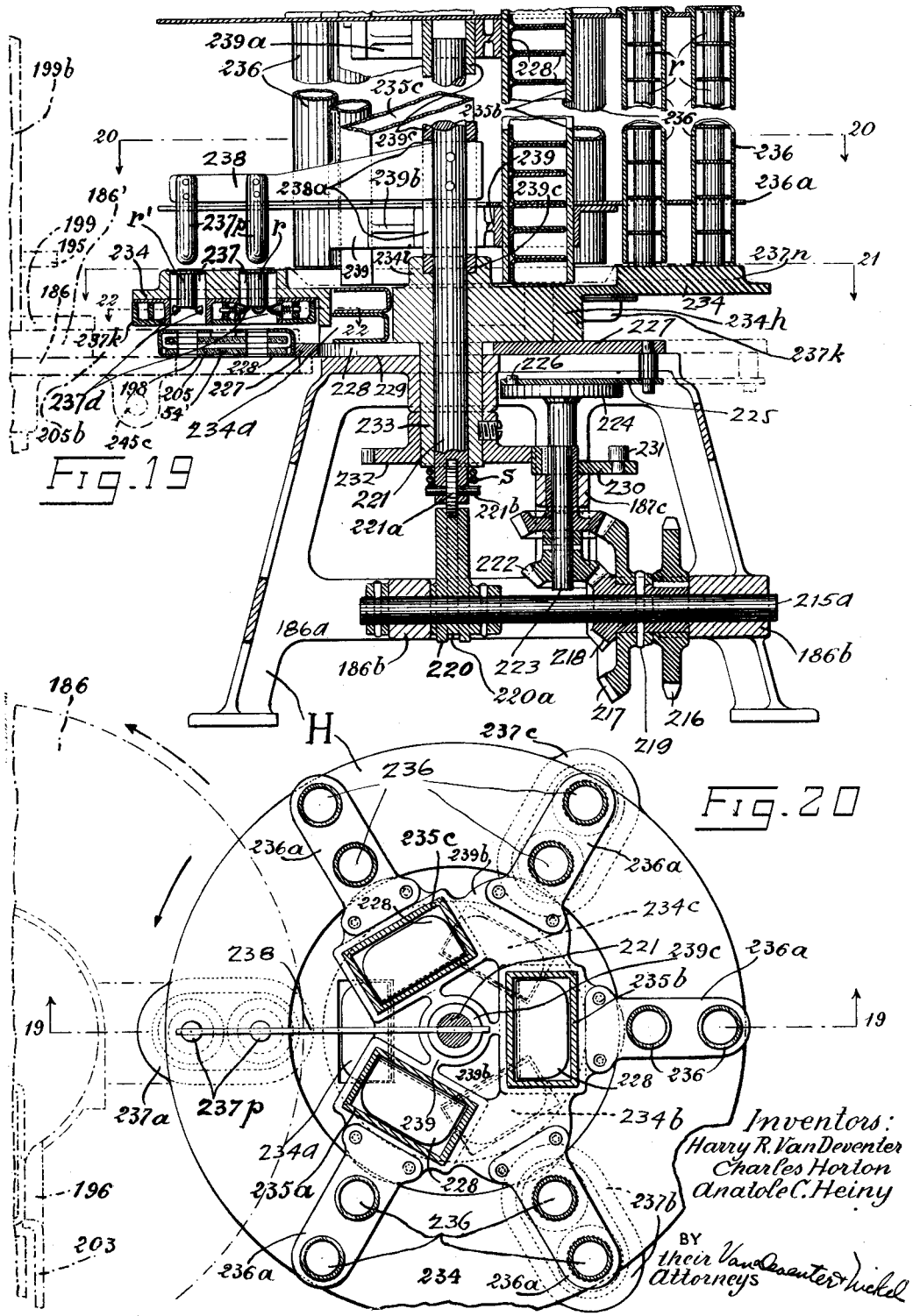

Dec. 17, 1929.  C. HORTON ET AL  1,740,177
CONDENSER ASSEMBLING MACHINE
Filed Jan. 2, 1925  14 Sheets-Sheet 11

Inventors:
Harry R. VanDeventer
Charles Horton
Anatole C. Heiny
BY their VanDeventer & Nickel
Attorneys

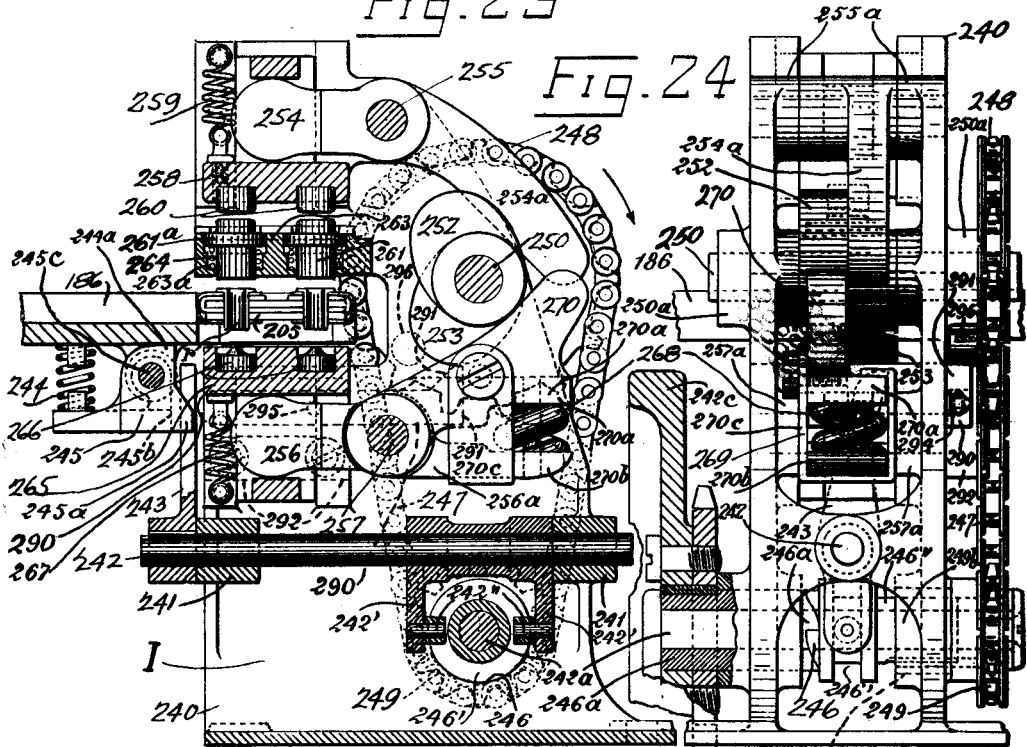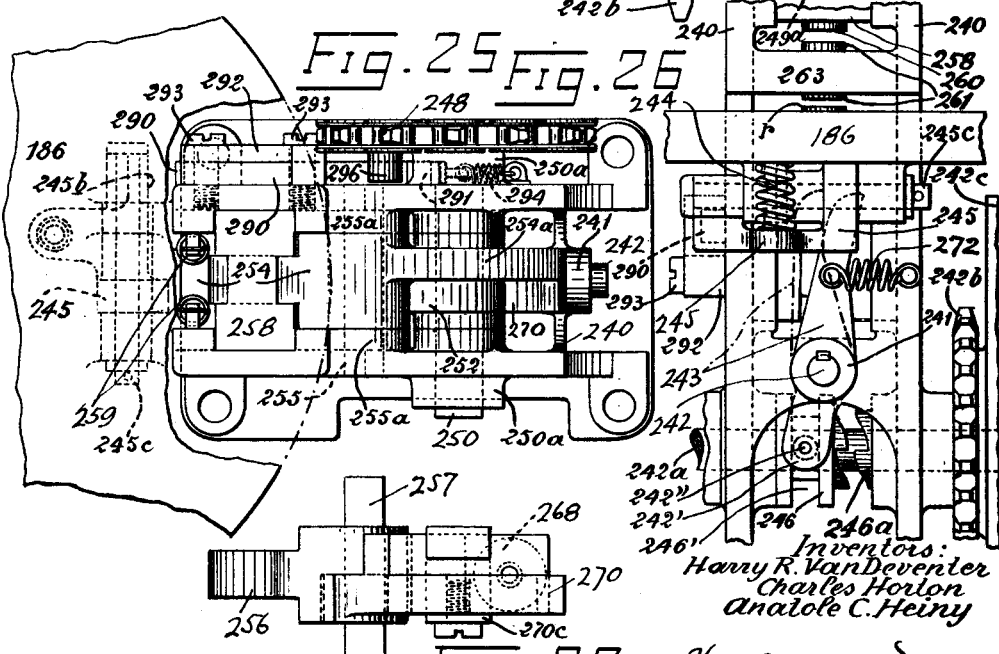

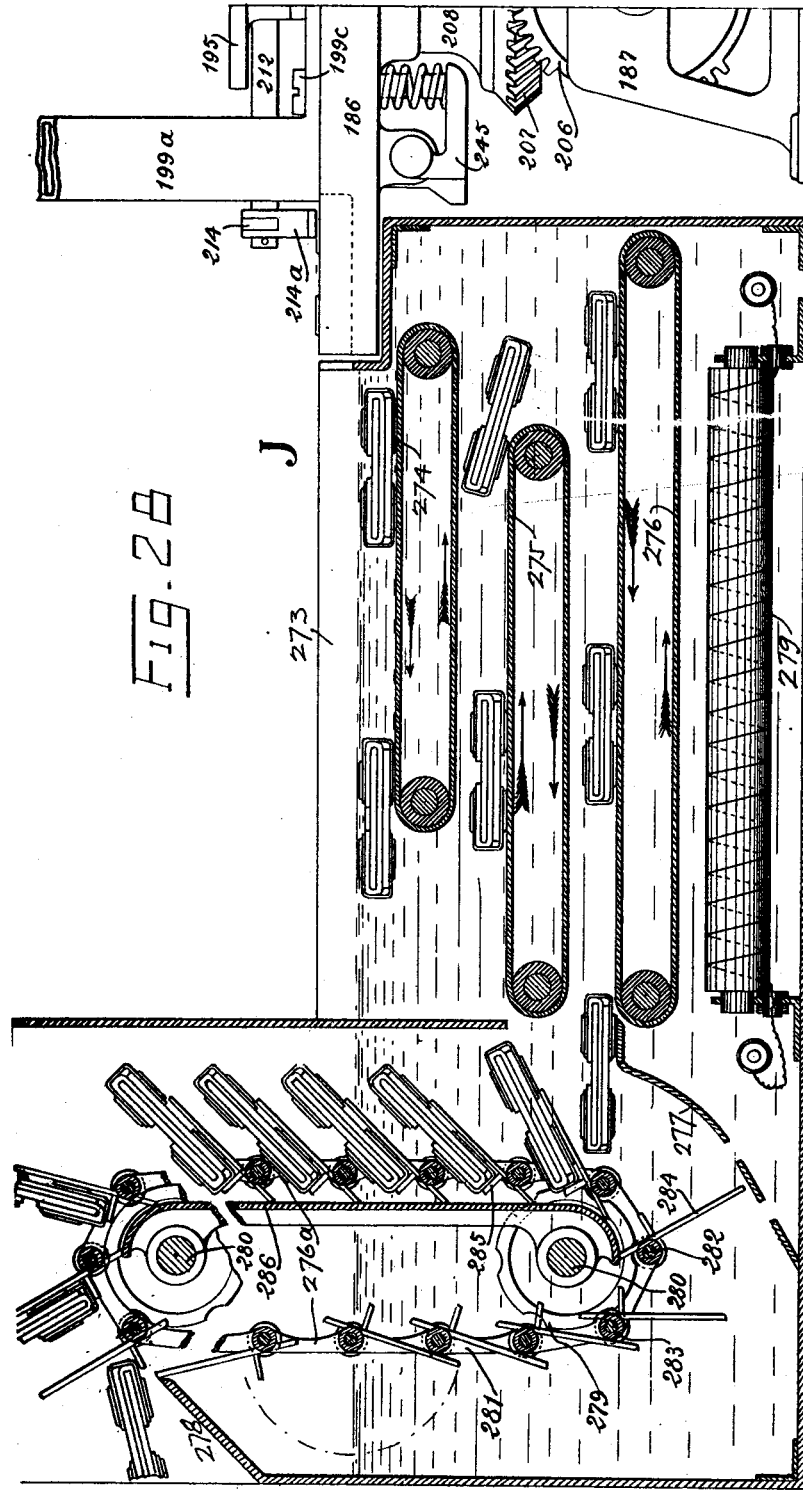

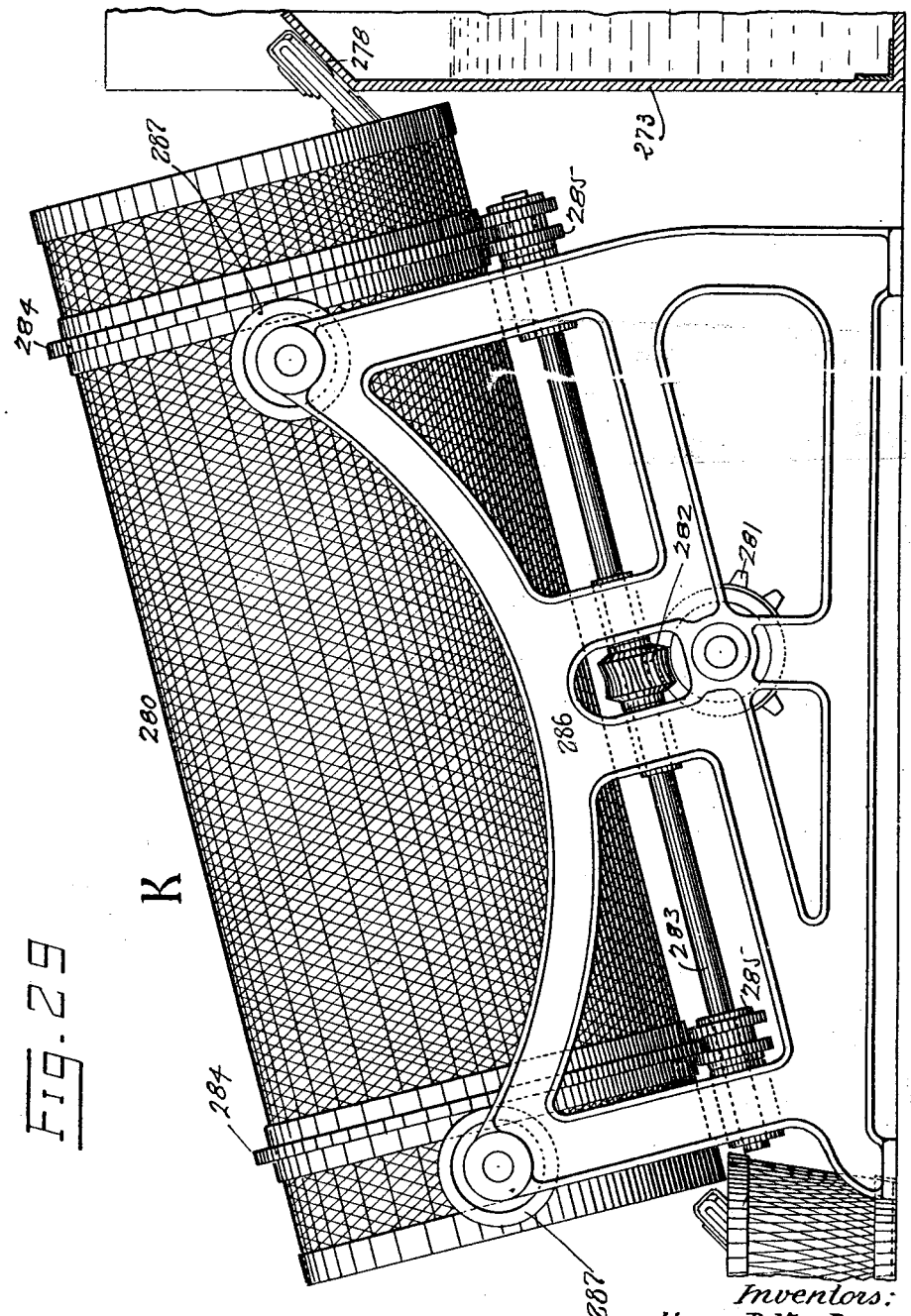

Patented Dec. 17, 1929

1,740,177

UNITED STATES PATENT OFFICE

CHARLES HORTON, OF RIDGEFIELD PARK, NEW JERSEY, HARRY R. VAN DEVENTER, OF NEW YORK, N. Y., AND ANATOLE C. HEINY, OF RIDGEFIELD PARK, NEW JERSEY, ASSIGNORS, BY DIRECT AND MESNE ASSIGNMENTS, TO DUBILIER CONDENSER CORPORATION, OF NEW YORK, N. Y., A CORPORATION OF DELAWARE

CONDENSER-ASSEMBLING MACHINE

Application filed January 2, 1925. Serial No. 289.

This invention relates to a method of automatically assembling and manufacturing condensers, especially mica condensers.

Condensers, the method of assembling which forms the subject matter of the present invention consist essentially of sheets of electrically conductive material, such as metal foil; sheets of insulating material such as mica; protective covers of any suitable material, such as bakelite, for example; and metal clips and eyelets by means of which the several parts are held together and which also serve to secure the condenser to any other apparatus with which it may be used. In this type of condenser, a plurality of sheets of mica and sheets of foil are alternately superimposed upon one another, a sheet of mica, next a sheet of foil, then a sheet of mica and again a sheet of foil, and so on; with bakelite covers on each face or side of the composite stack so formed, and finally a metal clip attached to each of the opposite ends of the resultant combination. By this means the superimposed layers of foil and mica are properly secured to one another in correct electrical relation, safely protected against injury and adequately equipped with means for conveniently connecting the condenser in circuit.

Among the objects of the present invention is to provide a novel method of assembling condensers through automatically operating means; the method including the various steps of cutting foil, selecting mica sheets, alternately superimposing layers of foil upon the mica sheets, positioning the bakelite covers on the partially assembled stack, affixing clips to the ends of the completed stack, immersing the completely assembled condenser in an insulating bath and finally drying the finished product by centrifugal means.

Another object of the invention is to provide a complete series of steps from which human operation is omitted in the assembly of condensers.

A further object is to develop a co-relation of steps whereby a series of operations are simultaneously performed to produce a continuous method of putting the various parts of the condenser together.

Yet another object is to provide a method of mechanical assembling wherein the product can be varied in size and capacity as regards the mica and foil layers, without affecting the continuity of the process.

Other features, capabilities and advantages of the invention will appear from the subjoined detailed description of the manner of practising this invention illustrated in the accompanying drawings, in which, Figure 1 is a general plan view of all the devices combined in a unitary mechanism or apparatus for performing the method of assembling condensers.

Figure 2 is a vertical transverse sectional view on the line 2—2 of Figure 1.

Figure 3 is a partial plan view of what is below the line 3—3 of Figure 2.

Figure 3A shows another mechanism for the same purpose as the structure illustrated in Figures 2, 3 and 4.

Figure 4 is a partial plan view of what appears in Figure 3.

Figure 5 is a vertical longitudinal midsectional view of the mica selector and mica delivery mechanism from the selector to the central distributing turret.

Figure 5B is a partial sectional elevation of the electric controlling means for the driving mechanism of the central mica distributing turret.

Figure 5C shows a modification of the structure of Figure 5B.

Figure 6 is a plan view of what appears in Figure 5.

Figure 7 is a plan view of one of several mica conveyors extending from the central to the outer turret.

Figure 8 is a vertical sectional view on line 8—8 of Figure 7 showing the mechanism at the moment after delivery of the first mica sheet upon the bottom bakelite cover of a stack.

Figure 9 is a vertical sectional view of the same but showing the mechanism mid-way of its return movement to the central turret to receive another mica sheet for delivery to the next following stack.

Figure 10 is a right end view of the structure of Figure 9.

Figure 15 is a vertical front view of the stack transfer mechanism for removing the completed stacks and delivering them to another turret to be completed.

Figure 16 is a plan view of the structure shown in Figure 15.

Figure 17 is a plan view of the turret for delivering the stacks to the separate stack-finishing apparatuses on line 17—17 of Figure 18.

Figure 18 is a vertical mid-sectional view of the same on line 18—18 of Figure 17.

Figure 18B is a face view of the relative positions of the two quadruple sector gears which control the attaching mechanism for the metal clips and eyelet rivets.

Figure 19 is a vertical mid-sectional view, on line 19—19 of Figure 20, of the mechanism for providing the stacks with clips and eyelet rivets.

Figure 20 is a sectional plan view of the same on the line 20—20 of Figure 19.

Figure 23 is a vertical mid-sectional side view of the stack riveting machine.

Figure 24 is a rear end view of same.

Figure 25 is a top plan view of the same.

Figure 26 is a partial front end view of the same.

Figure 27 is a top plan view showing the assembly of the composite lower riveting lever.

Figure 28 is a vertical mid-sectional view of the impregnating tank for the immersion of the condensers after completion, and, Figure 29 is a vertical side view of the dryer cylinder for drying the condensers after treatment in the impregnating bath.

On the drawings the same numerals identify the same parts throughout.

Figure 12:
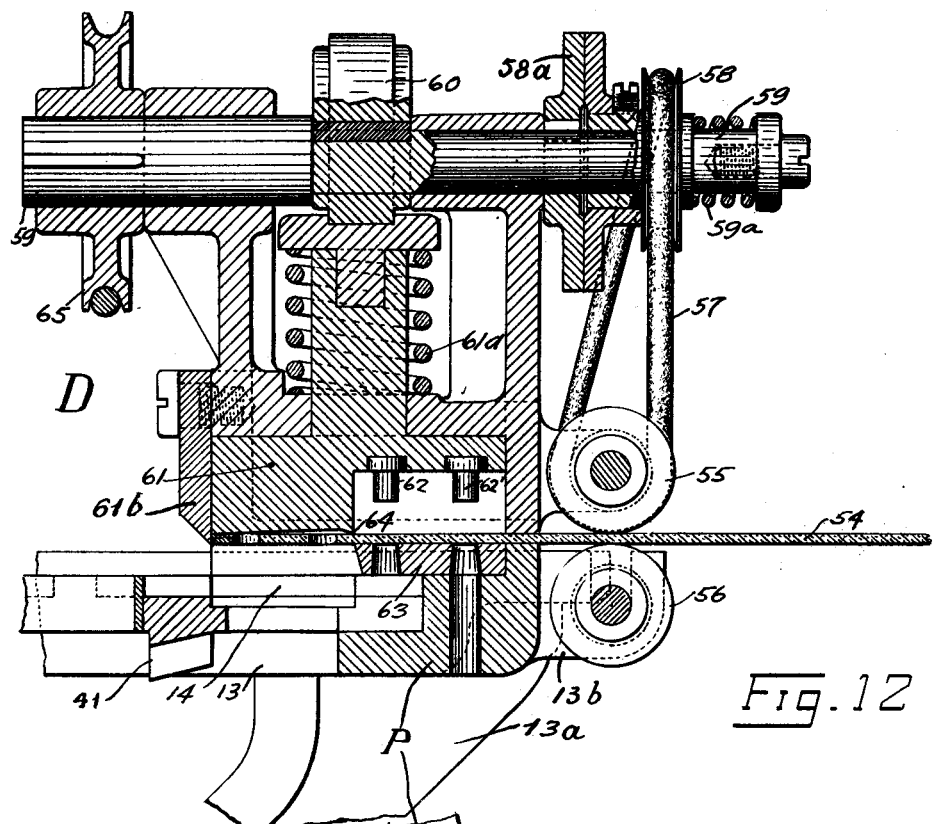
Figure 12 is a vertical mid-sectional view of the same on line 12—12 of Figure 11.

In Figure 1 there is illustrated a complete apparatus (comprising an outer turret or support 13 having pockets 14 in which the condensers are formed; and an inner mica-receiving and mica-distributing turret or support 15) for performing a series of operating steps and thus progressively effecting the complete assembly of the condenser. To this end there is shown a diagrammatical layout in which, Letter A represents a device by which is performed the first step of progressively selecting and feeding to the apparatus the sheets of mica or other insulation of a predetermined thickness, the operative parts being shown in detail in Figures 5 and 6. These sheets of mica are moved by a conveyor 81 to the inner turret 15, where they are received in pockets 16, and from the turret 15 these sheets are transferred by suitable mechanism to the outer turret 13.

Figure 11:
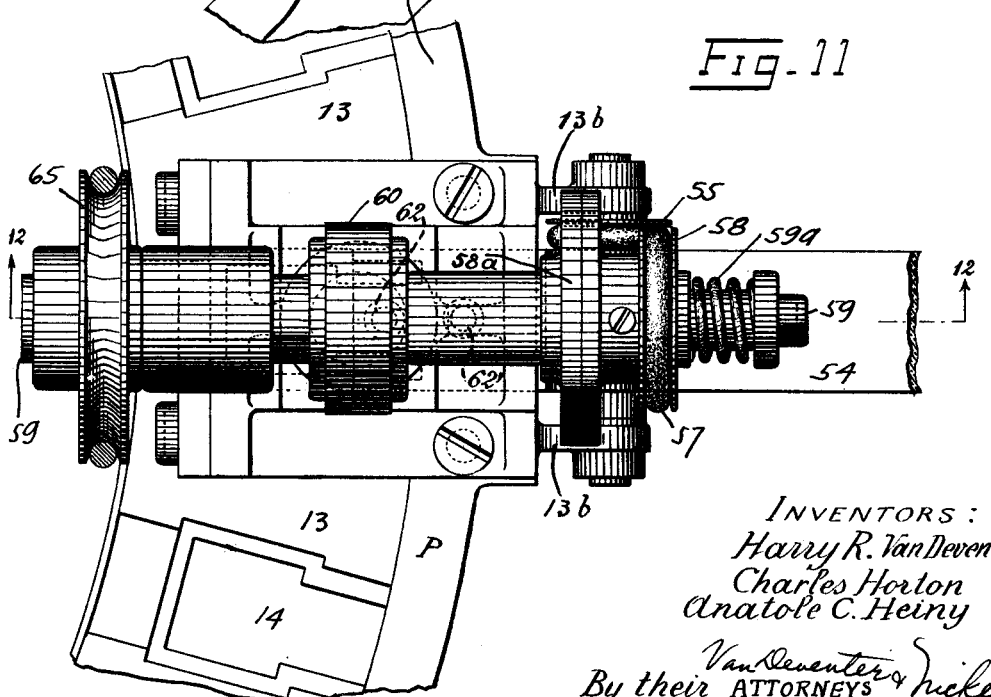
Figure 11 is a plan view of a press for punching the bottom bakelite cover of a stack and delivering it to the outer turret.

Letters D and D' indicate devices for performing the steps of punching and placing respectively the lower and upper covers of insulating material, and is illustrated in detail in Figures 11 and 12. The lower covers, which are preferably pieces of bakelite insulation, are supplied by the device D. This insulation is in the shape of a strip 54, and this strip is fed into the device which cuts off pieces of the right size and deposits them in the pockets 14 of the turret 13, in succession. As the turret 13 revolves the pockets 14 are carried away from the device D, and on the covers in the pockets are placed the alternate sheets of metal foil and mica, the latter coming from the inner turret 15. When each condenser arrives at the device D' it receives its top cover of bakelite in the same way.

Letter B represents devices by which is performed the step of transferring and of distributing the mica sheets from the inner turret 15 upon the outer receiving turret 13, and is illustrated more in detail in Figures 4, 7, 8, 9 and 10, this transfer and distribution occurring between the devices D and D', where the bottom and top covers are supplied to the condensers.

Figure 14:
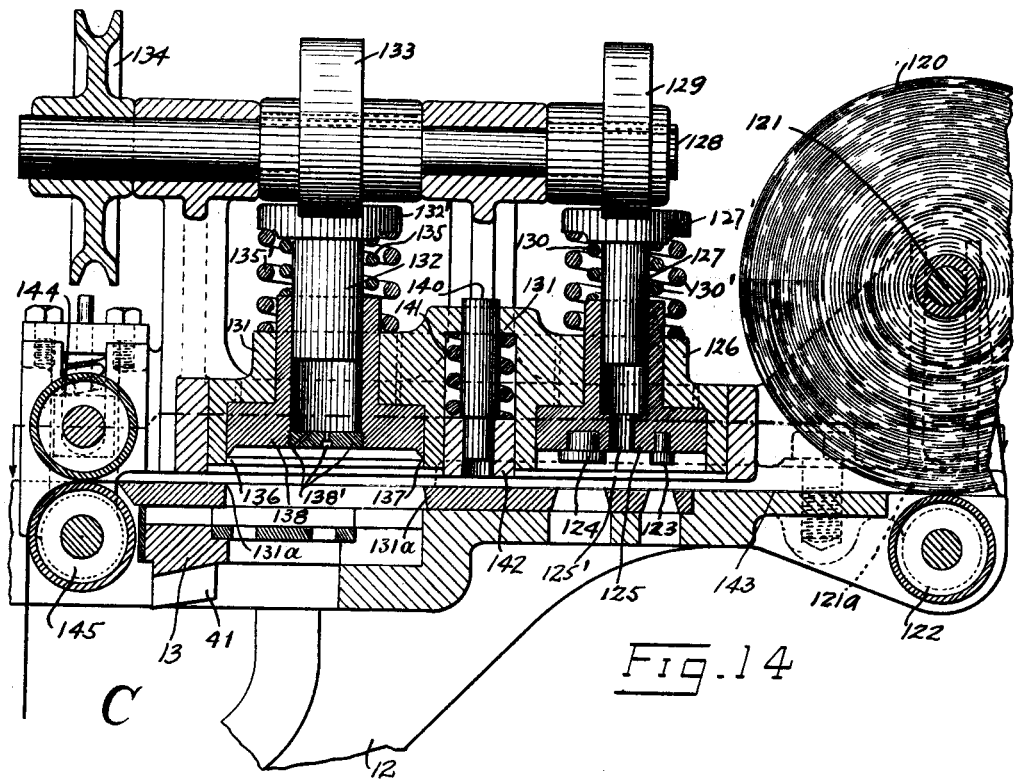
Figure 14 is a vertical mid-sectional view of the same on line 14—14, of Figure 13.
Figure 13:
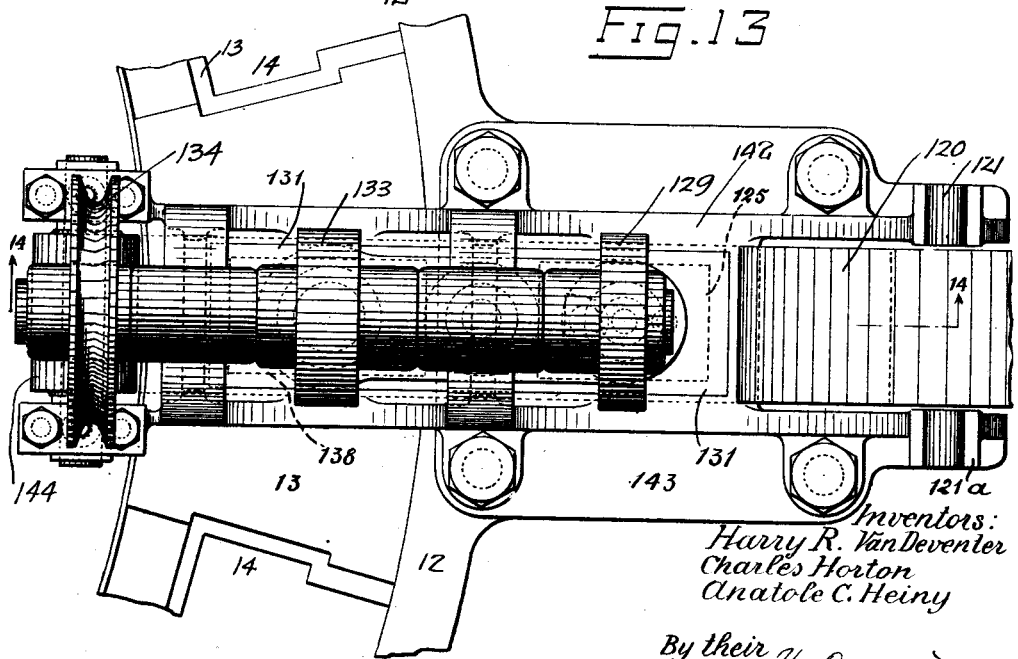
Figure 13 is a plan view of one of the punching presses for cutting the tinfoil or other electrically conductive sheets and delivering them to the stacks in the outer turret.

Letter C indicates the foil punching and foil delivery devices, the complete apparatus therefor being shown in detail in Figures 13 and 14, these devices operating in conjunction with the devices B for laying the sheets of mica and metal foil alternately on the bottom.

Letter E indicates the step of forming the stack of the condenser in alternating layers and is shown in detail in Figures 8 and 9.

Letter F represents the revolving ring-like body of the outer turret 13 for carrying the whole and partly formed condensers through successive necessary positions, the operation being shown in Figures 2, 6 and 7.

Letter G represents the device for transferring the completed condensers to the finishing devices shown in Figures 15 and 16.

Letter H represents the device for equipping the condensers with end clamps and inserting the rivets therein and is shown in detail in Figures 19, 20, 21 and 22.

Letter I represents the riveting device and is shown in detail in Figures 23 to 27 inclusive.

Letter J represents a conveyor for carrying the condensers through the impregnating bath, said step being more clearly shown in Figure 28 and, Letter K represents a device for performing the final drying step shown in Figure 29.

It should be understood that the number of devices for supplying sheets of the mica and foil to constitute a stack may be varied to suit the capacity or size of condenser desired without affecting the continuity of the process; thus, whereas in the specific example shown in the drawings there are several receptacles or pockets on the main or outlet turret which are not in operation, it may easily be seen that all the pockets might be put into use, if desired.

In the drawing Figure 1, the outer turret 13 in the pockets 14 of which the stacks are formed, is made with twenty-four pockets. But the stack forming devices, viz. the foil cutting devices indicated by the letter C, and the mica laying devices indicated by the letter B, are respectively only six and seven. In the present instance, we shall suppose the apparatus to be arranged to make only stacks of six foils or other conductive sheets and seven mica or the like insulating sheets; one mica sheet between each pair of adjacent foils, a mica sheet between the lower cover and the foils, and another mica sheet between the upper cover and the foils. The stacks can also be built of either two foils, four foils, and six foils. If stacks of greater capacity are required, say for example, of eight foils and nine micas, the apparatus is then provided with eight foil cutters C and with nine mica layers B. The cover cutters D can then be removed and relocated closer together. And if yet larger stacks should be wanted, a turret with a greater number of pockets could be built. We build the inner mica-distributing turret 15 to be capable of replacement by one of a greater number of pockets and provided with the necessary number of mica transferring and distributing devices B.

To practise the invention we construct a frame 12, Figures 2 and 3, to support the outer turret 13, which has the pockets 14, and around which the various necessary devices are successively situated as above mentioned. The turret 15 is rotatably mounted concentrically within the turret 13, and the pockets 16 of the turret 15 have mica sheet guide slots 16$^a$, the purpose of which will later be set forth.

For operating the larger turret 13 there is mounted on base 12 a series of brackets which carry bearings for supporting various rotating shafts. In bracket 17, at the left of Figure 2, there is shown a shaft 18 upon which is pinned a bevel gear 20. On the vertical shaft 21 located in frame 12 there is fixedly mounted a bevel gear 22 meshing with the bevel gear 20. As this shaft 21 rotates it carries with it the driving crank 23, shown fully in Figure 3, which rotates the six faced star wheel 24 fixed to the shaft 25, forming a Geneva combination, as is well understood in the art. Both shafts 21 and 25 are mounted in bearings fixed in the base 12. To the upper end of shaft 25 there is keyed the spur gear 26 which meshes with another spur gear 27, the latter gear having double the number of teeth of gear 26. The gear 27 rotates freely around a hub 28, which is integral with the inner turret 15. To the hub of gear 27 there is keyed a gear 29 (under the gear 27) to mesh with gear 30 loosely mounted on shaft 25. To the hub of said gear 30 there is keyed a gear 31 (under gear 30) to mesh with a gear 32 loosely mounted on the hub 28. To the hub of gear 32 there is keyed a bevel gear 33 (under gear 32) which meshes with a bevel gear 36, mounted fixedly on shaft 37 rotating on bearing supports 38 and 39 in the base 12, at the right of Figure 2. At the opposite end of said shaft 37 there is fixedly mounted a bevel gear 40 meshing with and rotating a circular gear 41 under and around and integral with the inner periphery of the ring-like body of the turret 13.

On the left end of shaft 18 by which the above described train of gears and turret 13 are driven, there is fixedly mounted an electric motor Ma, (the control of which will be described later) to operate the shaft 18 and gear train.

In the center and integral with the base 12 is located a fixed vertical bearing 12$^a$, into a recess of which is set an annular ball-bearing 34. The hub 28 passes through this bearing and rests on ball-bearing 34 by means of a shoulder 35'. This hub contains the shaft 35 extending upwardly and rotating freely within hub 28. This shaft 35 has a shoulder 35$^a$ engaging and resting on a similar shoulder in the hub 28. On the top of the turret 15 is fixed a disk 43 having two gear sectors 44 shown in dotted lines in Figure 4. On a pin 45 supported by a bracket 46 attached to a fixed part or wall 90 to be mentioned later, there is pivotally mounted on a gear segment 47 which meshes with the sectors 44. Segment 47 is linked to an oscillating disc 51, loosely supported by shaft 35, (it may rest loosely on a collar surrounding shaft 35), by means of an arm 48, a pin 49, a link 50 and a pin 50'. When either one of the gear segments 44 gets out of mesh with the gear segment 47 on one periodical revolution of the disk 43 in the direction of the arrow, Figure 4, the disc 51 is instantly pulled back in the direction opposite to the arrow by means of a spring 51' attached by one end to a pin 52 under disc 51 and attached by the other end to the opposite part 90 of one mica sheet distributing device or trough B, returning segment 47 and link 50 into the position as shown by the dash and dot lines.

It is this periodical oscillating swing of the disc 51, the control of which will be described further on, which sets the motor Ma in intermittent operation at the end of each oscillation. This result is obtained by means of a bracket 53 of insulating material fastened upon the rim of disc 51, as shown in Figure 4. On the bracket 53 is fixedly attached and extending downwardly a vertical spring metal blade 53'. On a radially extending portion of each bracket 46 and 46$^a$, the latter, (with spring 51'), being attached to one part 90 there are fixed two insulated upwardly extending spring metal blades S and S'. Spring blades S of brackets 46 and 46$^a$ are connected by wires W to one commutator brush of the motor Ma. Blades S' are connected by other wires W' to one side of the source of power $p$, the other side of which is connected to the other commutator brush of the motor Ma. As shown in Figure 4 the downwardly extending spring metal blade 53' is in contact with spring blades S and S' of bracket 46; bridging the gap between these blades and thus closing the electric current from the source of power through motor Ma.

The duration of the circuit closing contact of blade 53' with blades S and S' is only long enough to give one single revolution to the driving crank 23 and thus, as is understood, to advance turret 13 one step, or one twenty-fourth of one complete revolution. At the moment when this step is accomplished, the segment 44 which has been in mesh with segment 47, gets out of mesh, and disc 51 is pulled backwards, as above explained, and spring blade 53' breaks the electric circuit through spring blades S and S' of bracket 46, but immediately afterwards re-establishes the said circuit through spring blades S and S' of bracket 46$^a$. The duration of the circuit closing through these latter blades S and S' is of the same length as in the former and also only to give turret 13 another step forward of one twenty-fourth revolution, but the return of spring-blade 53' to contact now again with spring blades S and S' of bracket 46 is considerably slower as will be explained further on.

Following is the operation of the apparatus thus far described. As the electric motor Ma is made to rotate it causes gear 20 on the same shaft also to rotate. Gear 22 in mesh with gear 20 actuates the Geneva movement 23—24 to cause an intermittent six step progression. This intermittent movement is transmitted by shaft 25 to gear 26 which meshes with gear 27 to cause the latter to make one-twelfth of a revolution for each turn of the gear 22. Since gear 29 is one-half the diameter of gear 30, it decreases the ratio to one twenty-fourth. Consequently, through gears 31 and 32 of equal diameter, gear 33 moves in a progression of steps of which twenty-four complete a revolution. Thus the turret 13, through gears 36, 40 and 41, is caused to make a complete turn of twenty-four steps for each revolution of twenty-four steps of gear 33.

Another type of mechanism for producing one revolution of the shaft 21 for every swing in one direction of the disk 51, is illustrated in Figure 3A. To this end, the brackets 53, together with the contact plate 53' and the contact tongues SS' are omitted, and the disk 51 is provided on its circumference with a cam 51$^a$. Engaging the periphery of the disk 51 is a push bar 300 resting upon a support 301 and arranged to slide through a bearing 302 on said support. The other end of this bar has a pin which engages a slot in the upper end of a lever 304 mounted upon a journal or pivot 305. To the lower end of this lever is attached a tension spring 306 anchored to any suitable fixed support indicated at 307; this spring action to keep one end of the push bar 300 pressed against the periphery of the disk 51. The lower end of this lever 304 is also slotted and pinned at 308 to a bar 309, pivotally connected at its opposite end to an arm 310 mounted to swing loosely on a shaft 21$^a$. The gear 22 and motor together with the shaft 18, pinion 20, source of current $p$, and wires W and W' are dispensed with. Fixed to the shaft 21$^a$ is ratchet wheel 311. The arm 310 also carries a one-way pawl 312 to engage the gear 311 and abutting a stop 313 on the arm 310; being pressed thereagainst by a spring 314. On the shaft 21$^a$ is a gear 315 meshing with a gear 316 on the shaft 21 carrying the crank 23.

With this apparatus, whenever the disk 51 swings the cam to the right, for instance, so as to make the adjacent end of the bar 300 ride over the nose of the cam 51$^a$, the arm 310 is actuated in such a way as to make the pawl turn the gear 311 and the shaft 21$^a$, also the shaft 21, through the gears 315 and 316; and the parts will, of course, be so designed as to make the shaft 21 rotate, as before, a complete revolution for each throw of the bar 309 and arm 310. As soon as the cam rides past the bar 300, the spring 306 will, of course, pull back the bar 309 without reverse movement of the gear 311, and the shaft 21$^a$, because the pawl will simply slip over the gear 311. When the disk moves in the reverse direction under the influence of the spring 51', the crank will again be advanced one revolution. If desired, the shaft 21$^a$ may also have fixed thereon a ratchet wheel 317 to be engaged by a spring pawl 318, to prevent reverse movement of the shaft 21 and crank 23 when the arm 310 carries the pawl 312 backward over the gear 311.

In this way, the disk 51 is made to oscillate as before and each oscillation in either direction will produce a complete rotation of the crank 23, acting through the gear train above described, to turn the turret 13.

It will also be noticed that, with the motor and electrical connections for effecting rotation of the gear 22, the lever 48 and link 50 connecting the segment 47 and disk 51, together make such an angle with each other that when the disk 51 moves in the direction of the arrow shown in Figure 4, the final stages of the movement of the segment 47, when actuated by one of the gear segments 44, do not carry the disk 51 very much further. Hence, when the plate 53' bridges the contact SS', further movement of the segment 47, though this further movement of the segment itself may be through an arc of some extent, does not result in carrying the plate 53' beyond the contacts SS'; but instead, such further movement only acts to press this plate 53' more firmly against the contacts SS' and these contacts may be made of such material that they yield somewhat under such circumstances and thus the circuit through the motor remains closed long enough to make one complete revolution of the shaft 21. The circuit is closed for a period of equal length when the disk 51 is drawn back by the spring 51' to cause the blade 53' to close the circuit through the other two pair of contact fingers SS'.

Turret 15, as explained, rests by means of a shoulder or collar 35' of its hub-sleeve 28 on thrust-ball-bearing 34. This sleeve extends downwardly through the fixed vertical bearing 12ª of base 12. Under the journal and on the end of the sleeve 28 there is keyed a wormwheel 28ª which is actuated by a worm 28ᵇ, fixedly mounted on a shaft 28ᶜ. The drive of this shaft is explained below. The rotation of the turret 15 of course causes rotation of the disk 43, and the turret 15 turns in a direction opposite to that of turret 13.

Around the periphery of the turret 13 and located on a circular platform P forming the upper part of base 12, supported by inclined brackets 13ª proceeding from the main frame 12 are the various assembling devices shown diagrammatically in Figure 1. The operation of each of these devices will be taken up in the order of the assembling of the condenser. The first step consists of the insertion of an insulating cover-plate. See Figures 11 and 12 which best explain this operation. A long bakelite strip 54 of the proper width is passed between friction rollers 55 and 56 supported on brackets 13ᵇ extending from platform P; this device being indicated at D in Figure 1. The upper friction roll 55 is driven by a belt 57 from a loose pulley 58 on shaft 59 having at one end thereof a pressure clutch spring 59ª. On the same shaft there is mounted a cam 60 for actuating a plunger 61 which is held out of operative position by spring means 61ª. When the active face of the cam 60 comes in contact with the plunger 61 the punches 62 and 62' carried on the lower recessed face of the plunger are forced into suitable openings in die block 63, while a knife edge 64, also on the lower face of the plunger at the proper position to cut off a suitable length, is simultaneously operated. Of course, the end of the strip 54 is punched first and the strip is then pushed in further to allow the perforated end to be cut off by the knife edge 64.

During the punching operation the bakelite strip 54 is held stationary, its extreme edge abutting against the lower end of the removable fixed guide blade 61ᵇ. As roller 55 is driven by the frictional clutch 58ª on the shaft 59, its effect on the momentarily stationary bakelite strip 54 becomes therefore practically nil during the stop, but its grip on the said strip is instantaneously effective the moment punch 61 has risen above the strip. On each down-stroke the plunger 61 cuts off the punched end of the strip 54 and punches the adjacent portion. The cam is driven through a pulley 65 which is in turn driven as required from a source of power not shown. The punched and sheared bakelite plate, the holes of which have been made previously by punches 62 and 62', is pressed into a receptacle 14 of the turret 13 upon completion of the action of the cutting edge 64. Subsequently the receptacle 14 is moved to the next following position by the co-action of gear 40, Figure 2, with the teeth of the circular rack 41 on the turret 13. The spring 59ª presses on the pulley 58 to make the clutch 58 effective. The shaft 59 must be driven in step with the movement of the turret 13 so that the cam 60 can operate at the proper instant to cut off a piece of perforated bakelite and deposit it in one of the pockets 14. To secure proper timing of the shaft 59 and cam 60, the pulley 65 should preferably be a toothed pulley or sprocket to receive a chain which is driven from some part of the apparatus connected to the rotating turret 13 or the rotating turret 15. For example, by reference to Figure 2 it can be seen that the shaft 59 can very easily be driven by gearing directly connected to the turret 15 or to the gear 27, the shaft 37 or any other rotating part, the driving mechanism for this shaft 59 being so designed that it will rotate at the exact speed required, relative to the rate of motion of the outer turret 15.

The next succeeding step consists in the insertion of a mica sheet on top of the piece of bakelite just punched and laid into the pocket 14, and now being progressively carried under the various mica distributors B and the tinfoil punch devices arranged above the turret 13. This operation, which is shown in Figures 7 to 14, is however, preceded by the operation shown in Figures 5 and 6.

Mica sheets of the correct size and rectangular shape and having suitable holes therein for the passage of eyelets therethrough, are fed by hand between rollers 66, 67, 68 and 69 of the mica sheet selector apparatus denoted by A in Figure 1. These rollers constitute a thickness-testing mechanism with other parts which will now be described. This testing mechanism comprises rollers, 66, 67, 68 and 69, a system of multiplying levers 80, two bridges 75 and 77 for the passage of the mica sheets, and a conveyor 81 for carrying the tested micas into the distributing turret 15. In the frame 73 are formed a pair of receptacles or bins 85 and 87. On bearings at the top of the frame 73 is mounted for rotation the roller 66, which is the only one of the four rollers shown, and is rotatably fixed in position. The other rollers are floating, 68 and 69 being mounted on levers 71, and 67 being mounted on levers 74. Levers 71 are shown pivoted on the frame at 72 and levers 74 are pivoted on a stirrup 79' hung as shown from levers 71 much in the manner commonly used in weighing scales. By this arrangement it will be seen that if the rollers 67 and 68 are forced apart as by the passage of a mica of too great a thickness, that the levers 71 will move upward while the levers 74 will move downward and whereas the motion of the rollers may be measured in thousandths of an inch the multiplied motion of the ends of the levers may be considerably greater.

This separating motion of the levers moves upward links 80$^c$ and moves downward links 80$^b$. Now as is shown, these two links are attached to levers 80$^a$ and consequently these levers will be given an extensive angular motion in a counter-clockwise direction. Links 82 attached to end of levers 80$^a$ will then be drawn upward a distance which will be of the order of one hundred or more times the distance that the rollers have been separated by the mica. Links 82 are connected to operate the bridges 75 and 77, which will now be described. Bridge 75 is pivoted on the frame 73 at 83 and when in its lowermost position (as shown in Figure 5) permits a mica proceeding from the roller system to slide over it to conveyor 81. It is equipped at each side with a downwardly projecting lug 76' which is adapted to co-act with a pin 86 on a bell crank 86$^a$. Bridge 77 is pivoted at 78 on the frame 73 and in its lowermost position permits a mica (provided bridge 75 has been raised out of the way) to descend directly into the bin 87. On each side of bridge 77 is a bell crank 86$^a$ rotatably mounted on pins 78 and carrying the pins 86 to engage lugs 76'. The frame 73 is open at the top where the movable bridges 75 and 77 are placed. The composite action of the above described parts is as follows: When a mica of the predetermined thickness passes through the rollers 66, 67, 68 and 69 the bridges 75 and 77 remain as shown in Figure 5 and the mica passes over bridge 75 to the conveyor 81 which catches it on one of the portions 81$^a$ and drives it along by means of one of the projections 81$^b$ until it is finally pushed into the guides 16 on the turret 15. If the mica is of too great a thickness then the rollers 67 and 68 are forced apart and the levers act to pull up the links 82. These links by means of the pins 84 mounted thereon and passing through levers 86$^a$ pull up the bridge 77 which pushes ahead of it the bridge 75. Both bridges being up, the mica is led downward under bridge 77 into the container 85. If, on the other hand the mica be too thin the rollers 67 and 68 approach each other, the levers multiply the movement and push downward the links 82, pins 84 turn the bellcranks 86$^a$ and pins 86 push against the lugs 76' under the bridge 75, which is thereby caused to rise. Thus the mica passes below bridge 75 and above bridge 77 into the bin 87. In order that micas may be properly positioned in the carrier spaces 81$^a$, two levers 81$^c$ support a roller 81$^D$ which is adapted to regulate the disposing of the mica sheets on the conveyor 81. The speed of conveyor 81 is correlated to that of the rollers 66, 67, 68 and 69, so that successive mica sheets 189 will necessarily fall into successive spaces 81$^a$ of the conveyor as the mica is fed by hand into the rollers 66, 67, 68 and 69. The roller 81$^D$ acts to prevent more than one of the mica sheets getting into each space 81$^a$ at a time, as will be understood, and must be far enough to the right (Figures 5 and 6) for the purpose. As shown in Figures 5 and 6, the rollers 66, 67, 68, 69 and 70 are driven by a gear 70 and a pulley 70$^a$; and one of the drums 88 may be connected directly to the gear 70 to be timed to move the belt at exact relative speed. Pins 78 and 83 project from the inside surface of the frame 73 and levers 86$^a$ are inside this frame, but links 82 are external to the frame and the pins 84 project through slots 82$^a$ in the frame to the interior thereof.

The mica sheets are fed by the conveyor 81 into pockets 16 of turret 15, one mica sheet into the pocket at the end of the conveyor, the succeeding mica sheets into the following pocket 16, as the turret revolves, and so on. This means that the rotating speed of turret 15 must be so regulated that it will always present an empty pocket 16 at the end of conveyor 81 at the moment a mica sheet is about to be pushed off the conveyor into the said pocket.

To obtain this perfect correlation, the longitudinal table T over which slides the upper part of the conveyor belt 81, and which is supported by brackets 73$^a$ and 73$^b$, that are adjustably fixed on the main frame 73 and that also support both drums 88 and 88' supporting and driving the conveyor belt 81, is provided at its delivery end, (Figure 5B and Figure 6,) with a yoke 89 having two upright arms 89$^a$ and 89$^b$. Across and above the conveyor and supported by said arms 89ª and 89ᵇ, are two small pivot shafts 89ᶜ and 89ᵈ. On shaft 89ᶜ is located a straight arm $a^1$ having at one end insulation $a^2$ carrying a contact pice $a^6$. The natural position of the arm $a^1$ is shown in Figure 5ᵇ in broken lines, but whenever one of the projections or fingers 81ᵇ of the conveyor belt passes that point it strikes arm $a^1$ and thus swings it to the position as shown in full lines. Shaft 89ᵈ is similarly provided with upwardly and downwardly extending arms $a^3$ and $a^4$ respectively. Arm $a^4$ in Figure 5B is actually two arms, see Figure 6, which support a small wheel $a^5$ between their ends. The arm $a^3$ also carries insulation at its end to bear a contact $a^7$. This wheel $a^5$ is somewhat less in width than the longitudinal slots 81ᵈ cut in the center of the conveyor and in each space or section 81ª; therefore whenever one of these spaces does not carry a mica sheet, roller $a^5$ falls through the slot 81ᵈ and the arms $a^3$ and $a^4$ take the position shown in broken lines in Figure 5B. On arms $a^2$ and $a^3$ the insulated electrical contacts $a^6$ and $a^7$ are respectively connected to the wires $w^1$ and $w^2$, which are connected at their other ends respectively to the source of power P¹ and one commutator brush Cᵇ of motor Mᵇ, the other commutator brush being directly connected to the other side of the source of power P¹. It is therefore clearly seen that so long as the spaces 81ª of the conveyor belt 81 contain mica sheets, arms $a^3$ and $a^4$ are held in the position shown in full lines Figure 5B, and then at the same moment when a mica sheet begins to pass under roller $a^5$, arm $a^1$ is struck by the projection 81ᵇ ahead of it and thus arm $a^2$ and $a^7$ come together and close the electric circuit through motor Mᵇ which then rotates shaft 28ᶜ and consequently worm 28ᵇ, see Figure 2.

In Figure 5B, arm $a^2$ is just about to fall and, thus breaking the electric circuit through the motor Mᵇ, stops it. The starting and the stopping of the motor Mᵇ is timed so that, as above explained, turret 15 will be advanced one step of its revolution only when a mica sheet 189 is ready to be pushed into the pocket 16 following next to the one into which a mica sheet has been pushed, even if belt 81 has made a full revolution around its drums 88 and 88' with its spaces 81ª empty.

Such a condition may occur quite often, because a series of mica sheets either too thin or too thick may be fed into the selector rollers 66, 67, 68 and 69 before a mica sheet of the correct thickness may be selected by the said rollers.

This correlation of rotation of turret 15 with the feeding into each of its succeeding pockets 16 of a mica sheet by the conveyor 81 is necessary otherwise the turret might present empty pockets to the mica distributors B, and consequently two or more foils in any one stack would be without their mica sheet separation.

Figure 5C shows another manner of operating the belt 81 and the turret 15 so as to prevent the turret from carrying any of its pockets 16 empty away from the delivery end of the conveyor 81. In the construction illustrated on Figure 5C, the lever $a^1$ is omitted and only the lever $a^4$ is utilized. The conveyor is divided into sections or spaces as previously, by means of projections 81ᵇ, and between each two projections is an opening 81ᵈ. One of the conductors such as the conductor $w^2$ is attached directly to the lever $a^4$, which of course is of some electrically conductive material; while the other conductor $w^1$ runs to a terminal or contact adjacent the upper end of the lever $a^4$. As long as there is a sheet of mica between adjacent projections 81ᵇ, the mica will run under the roller $a^5$ and hold the lever $a^4$ so that its upper end is separated from the contact connected to the wire $w^1$. But in case another section of the conveyor has no sheet of mica upon it, when that section arrives at the lever $a^4$, the slot or opening 81ᵈ through the belt or conveyor 81 in that section, permits the roller $a^5$ and the lower end of the lever $a^4$ to drop, thus connecting the two conductors $w^1$ and $w^2$.

On the shaft 88ª of the conveyor drum 88', for instance, I may mount a bevel gear 319 to turn a bevel gear 320, on a shaft 321, which has another bevel gear 322 to engage a bevel gear 323 on the shaft 28ᶜ. Thus the rotation of the conveyor can be made to take place at the proper speed, with respect to the travel of the conveyor 81. The gear 323 is loosely mounted on the shaft 28ᶜ, but it carries a clutch member 324 to co-operate with a clutch member 325. This member 325 must rotate with the shaft 28ᶜ, but can slide along the latter to some extent. It is normally engaged by a spring 326 abutting a collar 327 on the shaft 28ᶜ to hold the two clutch members 324 and 325 in engaging relation; the key for the member 325 being indicated at 325ª. This member 325 may also have a circular groove 328 in its outside surface to be engaged by the end of an operating arm 329, this operating arm being mounted to act as a magnetic plunger controlled by a solenoid coil 330. One terminal of this coil is joined to a contact 331 and the other terminal to a source of current 332. The opposite terminal of the source of current is united to a switch blade 333 which is kept away from the contact 331 by a spring 334. The blade 333 is pivoted to a solenoid plunger 335 controlled by a magnetic coil 336 which is in circuit with the conductors $w^1$ and $w^2$. In one of these conductors is a source of electrical energy 337. Whenever, then a section of the conveyor arrives at the lever $a^4$ without a sheet of mica thereon, a momentary drop of the roller $a^5$ and lower end of this lever, will close the circuit through the coil 336. The energizing of the coil 336 causes the plunger 335 to rise and close the circuit through the coil 330. Hence, the clutch member 325 is pulled away from the clutch member 324. While the conveyor drum 88′ continues to rotate, the shaft $28^c$ stops and so does the turret 15. But as soon as the next section of the conveyor belt with a mica sheet on it arrives at the lever $a^4$, the lever is lifted at its lower end and the circuit through the wires $w^1$ and $w^2$ is broken. Hence, the spring 334 can pull back the switch blade 333 so as to break the circuit of the coil 330 and allow the spring 326 to move the clutch member 325 back into engagement with the clutch member 324. Thus as soon as the conveyor belt carries a mica sheet again under the roller $a^5$, the rotation of the turret 15 is automatically resumed. The shaft $28^c$ may have a one-way ratchet 317 with a one-way pawl 318, the same as the shaft $21^a$.

Of course, the turret 15 and associated parts are heavy and will rotate slowly, the same as the belt 81, and just as soon as the clutch members 324 and 325 are disconnected, the shaft $28^c$ and the turret 15 will stop. But the closure of the circuit through the coil 336 will be for such a short time that the shaft $28^c$ will stop just long enough to permit the clutch member 324 to gain on the clutch member 325 and shaft $28^c$, the interval represented by the space between two successive teeth or projections on the clutch member 324; and so the turret will stop just long enough to wait for the next mica sheet to be dropped into the empty pocket 16 waiting to receive it, before the turret again starts to move. If two or more successive spaces or sections of the conveyor belt 81 have no sheets of mica thereon, the belt will gain so much more on the turret, and the turret will remain motionless so much longer, but will again start rotating as soon as the next mica sheet reaches it.

It is stated above that Figures 1, 2, 3 and 4 are intended to show the making of a condenser stack with six foils and seven mica sheets. Under these circumstances it is therefore necessary that turret 15 must always have all necessary pockets 16 with mica sheets in them. The turret 15 must therefore advance seven steps for every two steps of turret 13. Were a stack to have only two foils, turret 15 would therefore have to advance only three steps for every two of turret 13. For stacks of eight foils turret 15 would have to make nine steps for every two of turret 13. Hence it is clear that turret 15 must control the steps of turret 13. It has been explained above how this control is obtained by means of segments 44 meshing with segment 47 to force disc 51 to oscillate and produce movement of the shaft 21.

The disk 51 moves both forward and in the reverse direction, the forward motion being given to it by the shaft $28^c$ which causes movement of the turret and therewith movement of the disk 43, the segments 44 of which engage the segments 47 to carry the disk 51 around in a clockwise direction through a certain angle. Then, as soon as the segment 47 is released the spring 51′ pulls the disk 51 back. Since the turret 15 always has at least seven pockets 16, each ready with a mica sheet, the reverse motion of the disk 51 must take place only at the end of each half revolution of the turret 15; and simultaneously with the pulling back of the disk 51, the mica sheets are carried out to the turret 13 and laid upon the sheets of foil deposited by the punches or devices C. Suppose for instance the pockets 14 of the outer turret 13 bearing incomplete condensers, have reached the positions E, and at this instant the disk 51 is released so that the spring 51′ can move it back and at the same time all of the mica sheets ready are moved out upon the incomplete condensers in positions E. While this action is occurring, the reverse movement of the disk 51 causes rotation of the shaft 21 and associated gears to move the outer turret 13 one step to carry the pockets into position for the condensers with the newly deposited mica sheets to receive each sheet of foil from the devices C. In the meantime, the inner turret is continuing to rotate and sheets of mica are again being laid in the pockets 16, so that at the end of another half revolution, seven more of the pockets 16 contain sheets of mica ready to be carried out to the pockets 14 of the outer turret 13, and the rotation of the turret 15 is now again bringing one of the segments 44 into engagement with the segments 47 to carry the disk 51 again forward. This forward movement of the disk effects further movement of the outer turret 13 so that after receiving sheets of foil on top of the sheets of mica, the condensers in process of formation again come into the positions E, and as soon as the seven necessary pockets of the turret 13 are once more filled, the segment 44 in mesh with the segment 47 can release the segment 47, permitting the spring 51′ to pull back the disk 51 as before and simultaneously with this motion sheets of mica are carried out to be deposited on the tops of the sheets of foil as before. Hence, for every half revolution carrying seven pockets 16 past a given point of the turret 15, one forward and one backward movement of the disk 51 are accomplished, and in the same period two pockets 14 of the turret 13 are carried past a given point. During each half revolution of the turret 15, seven pockets are filled with mica sheets and promptly at the end of this half revolution seven mica sheets are transferred out to the pockets 14 of the outer turret, and during the next half revolution, the operation is repeated. As each condenser is finished, it is carried under the device D' to receive its bakelite cover. It may be added here that the disk 43, which is fixed yet removably attached to the upper end of the hub 28 of the turret 15, may be exchanged by another disk whenever a change in the number of foils in the stack has to take place. These various discs 43 may have three or more gear segments 44; and the number of teeth in the segments may also be variable and depends on the number of foils composing a stack.

With regard now to the transfer of the mica sheets from turret 15 to the stacks in formation on turret 13, the method is as follows:

Leading off from the center turret 15 there is a series of troughs represented by the letter B of Figure 1; and made, each by two vertical guiding walls 90 and the bottom trackway 91, Figures 2, 4, 7, 8, 9 and 10.

Within each trough and slidably supported by walls 90 there is a travelling carriage 92 operable through a pin 93 centrally located in the bridge 94 of the carriage. The pin 93 is united in cooperative relation with the disc plate 51 by a plurality of links 95, (Figures 2, 7 and 8) pivotally supported by vertical pins 96 on the said disc plate 51. Figures 1, 2, 7 and 8.

Pins or journals 93 vary in height according to their relative position on the circumference of the disc plate 51. The guiding walls 90 have along their length two guide slots 98 and 99 in which pins 100 and 101, mounted in projections 100ª at the ends of the sides of the carriage, reciprocate. Cooperating with the same pins 100 and 101 to allow for a vertical movement, is the gripping plate 106 of the carriage 92. This plate is provided with upright arms 104 and 105 having slots 102 and 103. Consequently, the carriage 92 is capable of horizontal reciprocation along slots 98 and 99, while the gripper plate 106 loosely connected thereto has at the same time leeway for vertical motion along slots 102 and 103.

The gripper member 106 has at its bottom a series of downward bent fingers or cleats 107 which contact at the rear of the mica sheets 189, 189ª, 189ᵇ and 189ᶜ and urge them along the trough upon forward stroke of the reciprocating carriage 92. Also on the base of the gripper member there is located a lug 108 having thereon a pin 109 upon which there are pivoted rocker arms 110. On both sides of the trough, on each wall 90, there is attached a spring 111 and plate 112 provided at 112ª with a laterally projecting flat base or part 113. Springs 111 which are fixed by one end to the wall 90, are connected by the other end to the vertical plates 112 which they hold tilted as shown in Figure 8.

In Figure 9 is shown the operation of carriage 92 with its gripper plate 106, midway on a rearward stroke for the extraction of one mica sheet 189 out of a pocket 16 of turret 15. Four mica sheets 189, 189ª, 189ᵇ, and 189ᶜ are seen here, three lying on trackway 91, and one still on the turret 15. They are separated one from the other by a space wide enough for the fingers 107 of the gripper plate 106 to come a slight distance behind each mica sheet, on the gripper plate's release from plates 113, as shown by dash and dot lines, Figure 8. The forward travel of carriage 92 and its gripper plate is just enough to advance one mica sheet into the place of the preceding one; for example sheet 189ᶜ is fed upon the stack in pocket 14 of turret 13; its place is taken by sheet 189ᵇ, which is replaced by 189ª and that one by the mica sheet 189 in pocket 16 of turret 15. At the further end of each side of each trough there is pivoted to a pin 114ª, a tripper arm 114 having a protruding abutment or projection 115 the purpose of which will be later described. Directly below this tripper arm there is located over the rotating turret 13, a cover plate 116 pivoted to the bracket 117 on the upper platform of the frame 12, and having a downwardly extending lug 118. At its extremity the said cover plate has three pins 119 in a transverse row, the two outer ones of which being actuated by the springs 119ª to press against the mica sheets after these are fed onto the stack, and the center one of which is fixed and adapted to pass through one of the eyelet holes in the mica sheet and thus guide it into correct position in the pocket 14 on the turret 13. Each of the outer pins 119 has a head 119ᶜ for limiting the downward extension of the pin when cover plate 116 is raised in position as shown by dash and dot lines.

The operation of the above described transfer mechanism is as follows: As the pins 96 are urged forwardly by the action of spring 51' on the disc plate 51 (Figures 2 and 4), each carriage 92 travels forwardly in the slots 98 and 99, carrying with it the gripper plate 106 which pushes the individual mica sheets forwardly step by step as explained, one mica sheet after another being thus urged into a pocket 14 of the turret 13; and as these pockets come in line with the troughs B.

To permit the mica sheets to enter the pockets 14, the tripper arms 114 act to hold up the plates 116 over the seven pockets at the outer ends of troughs B, the projections or pins 115 extending underneath the plates 116 at the sides, holding these plates in the position as shown in dash and dot lines. The tripper arms are held in this position each by a spring or springs 114ᵇ, secured at one end to the sides 90 of each trough, and passing around the pins 114ª, and having the opposite ends engaging a projection or stud 114ᶜ on each tripper arm. When each plate 116 is up, the springs 119ª which are between the lower face of the plate 116 and a head on the lower end of the end pins, hold the two outer pins down as far as they will go with their heads 119° against the top face of the plate; while the middle pin which is fixed, of course, does not change its position. All three pins permit the mica sheet to clear their lower ends as it is moved out of the trough B, and the projection 118 on the lower face of each plate 116 stops the sheet when it is directly over the adjacent pocket, and the sheet is thus allowed to fall into the pocket in the right position, as it is impelled by the outermost finger 107 of the plate 106. At this time, a projection 100$^b$ at the front end of each side of each carriage 92 engages the tripper arms and moves them against the springs 114$^b$, to the position shown in Figure 8, thus lowering the two tripper arms and causing the studs 115 to permit the plate 116 to drop. The middle pin 119 of each plate will engage one of the two holes in the adjacent mica sheet and thus guide it as it moves downward into its pocket 14; while the other two pins which are spring-pressed will rest upon the top face of the mica sheet and press it downward. As each mica sheet comes to rest in its pocket 14, the middle pin will have its lower end projecting slightly through the adjacent perforation in the sheet; while the other two pins will force the mica sheet downwards into its position on the stack owing to the weight of the plate, but when the mica sheet is on the stack, the springs 119$^a$ will hold plate 116 up to a sufficient extent for studs 115 to reengage it at its under face upon the return movement of the carriage, when the projection 100$^b$ is withdrawn, allowing each tripper arm, under the influence of springs 114$^b$ at each side, to raise its stud 115 and again lift the plate 116. The middle pin 119 may be slightly longer than the two side pins, and the bottom 91 of the trough may have an extension 91$^a$ adjacent the plate 116. All of the plates 116 are stationary, because they are mounted upon the frame 12 and when the turret 13 rotates, the condenser stacks are carried away from under these plates in their travel to the foil supplying devices C. Therefore, the plates 116 do not interfere with the laying of the foil sheets on the condenser stack.

Having delivered a mica the carriage 106 is returned by the action of disc 51 as explained, and during said back motion it is also raised upward by the co-action of the arms or pivoted heads 110 with the levers 112 and their flat bases 113 over which the arms or heads are forced to slide. See broken lines in Figure 8. Thus in returning carriage 106 rides up due to arms 110 sliding over bases 113, but on its forward stroke it moves in a straight line with arms 110 passing under the flat bases 113. The result of this arrangement is that the plate 106 makes a move forward in a straight line, then up on the backward motion, and then down when at the rear, to start in a straight line forward again; the effect being, of course, to miss the micas on the return stroke to avoid pulling them back after moving them out on the forward stroke. The position of the carriage 106 when half way returned to the rear is shown in Figure 9. The moment the carriage 92 is retracted, slightly ahead of the second serial step rotation of turret 13, it recedes also from contact with tripper arm 114. This arm under the action of a spring 114$^b$ is raised again, the pins or studs 115 strike the under surface of cover plate 116, which is then raised, and thus at the same time lifts pins 119 from the mica sheet that was just deposited in pocket 14 of the turret 13.

The next step in the operation consists of super-imposing a foil sheet upon each mica sheet deposited in the pockets 14 of the turret 13. Reference is made now to Figures 13 and 14 wherein 120 is a roll of foil mounted on a shaft 121 on brackets 121$^a$ and having cooperating therewith a smoothing roll 122 located on the frame below the foil roll. The foil is wider than the width of the actual foil armature to be punched, the reason for which will become evident below.

The punching mechanism which serves to cut out and form the foil armature consists of two punches 123 and 124 mounted on a plunger 125 in the end 126 of block 131. These punch members are actuated by the same plunger 127 when it is pushed downward by cam 129 which is mounted fixedly on the shaft 128, which is driven from the pulley 123. At the other end of the sliding block 131 there is mounted a cutting die 138 which has edges 136 and 137 entirely around it which cooperate with the shear edges in the die block 131$^a$ directly below to punch out a foil sheet of suitable shape from the ribbon of foil 143. This punch is operated by the cam 133 also fixedly mounted on the shaft 128. Both punches 125 and 138 are able to reciprocate for a limited distance up and down in the block 131 and are engaged by springs 135 and 130 which springs in turn normally hold up plungers 132 and 127 respectively, by engaging the collars or flanges 132' and 127' at the upper ends of the plungers. The block 131 is acted upon upwardly by spring 141 and is guided in its up and down motion by post 140. Spring 141 and post 140 are in a recess in block 131, which is encircled by a guide frame 142 fixed to base 12.

The action of the device is as follows: When the cams are in the inoperative position shown the parts are all in their uppermost positions shown in Figure 14. When these cams rotate with the shaft 128 they push down the plungers 132 and 127. This motion is transmitted through springs 135' and 130' to the sliding block 131; and, the spring 141 having become overcome, the block 131 moves downward until its bottom surface comes down against the foil strip 143 in order to hold it against wrinkling when cutting. Up to this time plungers 138 and 125, pressed down by the springs 135 and 130, have been travelling with the block 131, but upon the block striking the die plate, these plungers continue to move because the plungers 132 and 127 continue to actuate them through the springs 135 and 130, respectively, though the block 131 has stopped and springs 135' and 130' are being compressed; and the punches 123 and 124 are pushed through the foil, cutting suitable holes for cooperation with eyelets, and shear block 138 cuts through the foil, severing therefrom a foil sheet which is pressed downward towards the pocket 14 in the turret 13, and the holes of which were punched in the previous downward stroke of the punches. Plungers 132 and 127 still continue their downward travel while springs 135' and 130' are compressed further. This downward motion of the plungers 132 and 127 in the plungers 138 and 125 causes a rush of air through the apertures 138' and 125' to blow upon the parts of the foil in order that they shall not be carried up with the punches upon their return stroke. When all these above described motions have been completed, all the parts return to the positions shown in Figure 14, ready for the next cutting stroke when the next receiving pocket 14 of the turret 13 comes into position. The remainder of the foil strip 143 is carried away by the rollers 145 and 144, which act as feed rollers and are driven by any suitable means. Apertures 138' and 125' are in the bottom of the bores through plungers 138 and 125.

This process is accomplished by all the devices shown at C in Figure 1 simultaneously, thus building together with the mica feeders B several condenser stacks at the same time. When any particular pocket 14 has progressed past all the positions of the turret 13, it has received alternate sheets of mica and foil and is ready to be equipped with clamps and eyelets and finished. Examination of the alternate punches C as diagrammatically shown in Figure 1 will show that the foil sheets are punched out in reverse positions, so that alternate foil sheets project from between the mica sheets at the opposite ends of the condensers; thus making possible electrical connection to foil sheets of the same polarity, as will hereafter be explained. The final operation occurring in the turret 13 is the adding to the stack of a bakelite cover, which is accomplished by the device D' Figure 1 in a way similar to that explained in the connection with Figures 11 and 12.

The wheel 134, the same as the wheel 65 should preferably be a toothed wheel or sprocket, so that the shaft 128 and the two cams 129 and 133 can be made to operate in time with the other devices. To secure this result, the shaft 128 can be connected by gearing of the proper design to be driven at the exact relative speed from the circular rack 41, for instance, of the turret 13; and the bakelite punching and shearing device D' is, of course, geared to run at the same exact relative speed as the bakelite cutting and shearing device D.

In the performance of the process as thus far described, completed condenser stacks are assembled by the apparatus; and it is important to remember that as the conveyor 81 (Fig. 5) moves, the drums or rollers 88 and 88' rotate at the same speed, because the conveyor carries on the inner face opposite the face bearing the projections 81$^b$, a number of projections 81$^e$ which enter recesses 81$^f$ in the drums 88 and 88'; the mode of operation being somewhat similar to that of a chain running upon two sprockets. The inner turret 15 rotates at the proper rate of speed with respect to the rate of travel of the conveyor 81, and the motion of the turret 15 acting through the disk 43 and segments 44, actuates the disk 51 to produce rotation of the outer turret 13 through a space necessary to carry any one of the pockets 14 from the device D in Figure 1, for instance, to the first device E, for every half revolution of this turret 15. And likewise, at every half revolution of the turret 15, the disk 51 when withdrawn by the spring 51' operates all the carriages 92 to transfer the mica sheets from the inner turret, to the outer turret. The devices D, B, C and D' all run at the required rate of speed proportionate to the rate of rotation of the turret 13; and if, at any time any one or more of the pockets or spaces 81$^a$ of the conveyor 81 do not contain a sheet of mica, the rotation of the turret 15 and therefore the motion of the disk 51, and the operation of the outer turret 13 and of the devices B, C, D and D', is stopped until the arrival of a space or section containing a mica sheet on the conveyor 81 effects the filling of the pocket 16 of the turret 15 in line with the conveyor 81 to receive it; so that as described, each of the pockets 16 of the inner turret will always receive a mica sheet, and no such pocket will ever be carried around by the turret 15 empty into line with one of the troughs B. When the machine is first started, of course, it does not at once make complete stacks until all of the pockets 14 and 16 together with the troughs B of the mica transfer devices become properly loaded with the material intended for them. At first, when the conveyor 81 is started, if the devices D, C and D' begin operating at the same time, the first bakelite cover disposed by the device D in the first pocket 14, on arriving at the first position indicated by E on the right of Figure 1, will now receive no mica sheet on top of it, because the pockets 16 of the turret 15, and the troughs B are not loaded to supply such a mica sheet. When this bakelite cover arrives at the first device C, it will receive on top of it a sheet of foil. When, however, the mica sheet transfer devices become fully loaded with say three sheets of mica apiece in line with each other as indicated in Figure 8, and all of the pockets 16 of the turret 15 from the conveyor 81 around to the transferring devices adjacent the device D', become loaded with mica sheets, the bakelite cover which is then supplied from the device D to the adjacent pocket 14 of the turret 13 will, upon arriving at the first position E at the right of Figure 1, have a sheet of mica placed on top of it. As it goes thence to the first device C, it will get its first sheet of tin-foil on top of the mica; then, another sheet of mica on top of the tin-foil, and so on around, until seven sheets of mica and six sheets of foil in alternation are piled up upon the top of this piece of bakelite; and when it reaches the device D', the top cover of bakelite is added. Mica sheets, too, will now be deposited on the sheets of foil in the pockets ahead of this piece of bakelite in the turret 13 but the stacks thus made will be imperfect and have to be rejected. The same series of steps will take place with each succeeding piece of bakelite supplied by the device D to one of the pockets 14, and each successive stack will thus follow the first; all being formed step by step and completed in turn as they reach the device D', so that if one passes back from the device D' to the device D, he will find the stacks consisting of fewer and fewer sheets of mica and metal foil, till the starting point at the device D is reached. Each sheet of mica as indicated upon the bakelite cover 54' in Figure 8 must have two openings in it to register with the openings in the bakelite, and each sheet of foil must have a recess $r$ in one end and a hole $h$ near the middle. The devices C are so arranged that they punch the foil sheets so that the recesses are alternately at one end of the sheets of foil and then at the other, as indicated in Figure 1. The unrecessed ends of the foil sheets project at the opposite ends of the stack, that is to say, the first foil sheet will project at one end, the next at the other end, the third at the same end as the first, the fourth at the same end of the stack as the second, and so on, so as to divide the sheets of foil into two halves, one half to be connected through the projecting ends to one terminal of the condenser and the remaining half to the other terminal. When the stacks are united together, the fastening means will go through the two holes in the bakelite covers, the two holes in the mica sheets and the hole and the recess of each sheet of foil. The fastening means which pass through the holes $h$ in the sheets of foil may make electrical contact with the sheets of foil thereat, but upon such fastening means going through the recess $r$ in the end of such a foil sheet, it will be out of electrical contact with the edges of said recess because of the large size of the recess. Since the recesses in the sheets of foil are alternately at opposite ends of the condenser stack, the fastening means going through one hole of the stack may make electrical contact with one half of the sheets of foil; while being out of contact with the intervening sheets of foil; and the fastening means which go through the other hole of the covers and mica sheets, will be out of contact with the first half of the sheets of foil; while it may make contact with the intervening sheets. Thus the fastening means hold the stack together; while one half of the sheets of foil are electrically disconnected from the other half.

The stacks having now been completed they are ready to be removed to the finishing turret. This transfer motion is accomplished by the device or mechanism shown at G in Figure 1 and illustrated in detail in Figures 15 and 16, and which will now be described. On a supporting base 148 which is fixedly located in suitable relation to the main frame 12 supporting the turret 13 is located a gear 149 driven by any suitable means not shown. This gear, too, should be rotated at the necessary rate of speed with respect to the turret 13 and it may be connected to this turret, the device D', or any other movable part, the same as the devices D and C. To the shaft 150 upon which said gear is mounted is fixed a bevel gear 151. To cooperate with this gear there is mounted on an upright shaft 153 located in the journal 148$^a$ in the base 148 a sleeve 155 having two half gear segments 156 and 157 diametrically opposite and positioned in offset axial relation to each other as shown. This sleeve rests on a thrust ball-bearing 152.

In line with shaft 153 there is a second upright shaft 159 located in a journal 148$^b$ of the frame support 148. Similarly there is on the base 148 a thrust bearing 160 above which which there is fixedly mounted on shaft 159 a sleeve 161 having integral therewith a spur gear 162 to mesh with spur gear segment 157 on the sleeve 155.

On the underside of the gear 163 loose on shaft 159 there is fixed a ratchet 164 in operating contact with a freely moving one-way pawl 165 on the gear 162. The gear 163 is integral with a collar 166 which is fixed to a sleeve 167 and to the upper extremity of which is fixed a bevel gear 168. This gear meshes with two bevel gears 169 and 170 loosely mounted on opposite ends of trunnion shafts or journals extending from and integral with a block bearing 171, which is fixedly held on the upper end of shaft 159 by means of a transverse key 168$^a$ and a set screw 168$^b$.

From bearing block 171 and integral with it there extend longitudinally and in opposite direction two sets of bifurcated bars 172 and 172ª having offset sections 173 and 174 upon which are mounted on pivot pins 173ª and 174ª the gripping means 146 and 147. The gripping means consists each of two jaws 177 and 178 whose motion towards each other serves to grip a condenser stack as shown in Figure 16. The jaws 177 are bifurcated, having perforated lugs 177ª, to serve as hinge portions, and receiving between them the hinged portions 178ª of the jaws 178. Pins 173ª and 174ª pass through the portions 177ª and 178ª.

The amount of distension or opening of the jaws is regulated by means of screws 183 and 183ª set in the rear extensions 183ᵇ of hinge portions 177ª of each upper jaw 177 and abutting against the under side of the bridges 173ᵇ and 174ᵇ on the double bars 172 and 172ª. Both of these jaws are similar in every respect. On pivot pins 173ª and 174ª there is fixed on each a rocker arm 179 at the outer end of which there is a pin or stud 180. To these pins there are pivotally connected links 181 and 181ª, on opposite sides of the bars 172 and 172ª, the other extremities of which being respectively connected to discs 182 and 182ª, each respectively integral and rotating with gears 170 and 169. The jaws 177 are loose on the pivots 173ª and 174ª and the jaws 178 are fixed on same.

As discs 182 and 182ª are rotated, rocker arms 179 are swung back and forwards, from the position shown in dash lines to the one shown in dash-and-dot lines, and as the hinged ends of the lower jaws 178 are fixed to pivots 173ª and 174ª, jaws 178 correspondingly swing from the dash lines positions to the dash-and-dot lines positions, incidentally forcing jaws 177 up and down with them by means of a pin or stud 180ª, which passes transversely through the hinge member 178ª of each jaw 178 and into the peripheral notch or recess 177ᵇ of the hinge member 177ª of each jaw 177. When pins 180ª come into contact with the upper ends or sides of the recesses 177ᵇ, arms 177 are raised into the dash-and-dot lines positions. On the recession of rocker arms 179, arms 177 fall back with them through gravity, and by the studs 180ª engaging the lower ends of recesses 177ᵇ, until screws 183 and 183ª come in contact with bridges 173ᵇ and 174ᵇ. The full lines in Figure 15 show all jaws at the moment of (at the right side of the figure) raising a condenser stack out of a pocket 14 of turret 13, and at the left side, at the moment of depositing the previously lifted stack into a receiving pocket of the device for finishing the condenser stacks. The outer ends of the pockets 14 of the turret 13 are open to give free play to the lower jaws 178.

At a medial point on each lower jaw there is located an abutment blade 185 which contacts with the portions 185ª of foil sheets protruding from one end of the condenser stacks and bends them upwardly, as shown, at the moment the lower jaw is raised into gripping position.

The operation of the transfer means proceeds as follows: Figures 15 and 16 show sector gear 156 in mesh with gear 163 with half of its semicircular periphery yet to revolve to complete the full raising of the jaws at the right side of the figure, and the jaws about to open at the left side. Sector 156 turns in clock-wise direction, and therefore gear 163 and pinion 168 naturally in the other direction, thus forcing disc 182 to turn also anti-clockwise, and disc 182ª in clockwise direction. Hence during the motion of gear 163, the disc 182 pushes link 181 of jaw 178 at the right fully to dot-and-dash line position; jaw 177 also rising and thus the adjacent stack is lifted out of the turret 13. At the same time disc 182ª is being rotated clockwise, pulling link 181ª in, and both jaws 177 and 178, then in dash and dot line position, are being lowered, holding a stack between them, and this stack is now laid in the right position on the finishing table 186, (shown in Figures 17 and 18).

When sector 156 ceases to be in mesh with gear 163, the jaws at the right are up and holding a condenser stack, and the jaws at the left are fully lowered and separated because the final movement of the link 181ª lowers jaw 178 into the dash line position. The stack transfer device is then in the position to swing one half revolution to transfer the raised stack at the right now to the finishing device and the other now open jaws, over and under another finished stack in turret 13. At that moment gear sector 157 comes into mesh with gear 162 and forces it to turn in anti-clockwise direction; and being keyed to shaft 159, it forces both arms 172 and 172ª to revolve with it so long as sector 157 stays in mesh with gear 162, i. e., one half revolution. During this revolving motion of the arms it is necessary that the jaws stay in the exact position they have been given by the action of gear sector 156 on gear 163; and to this end ratchet 164 and pawl 165 have been provided, the latter being fixed on gear 162; with which it turns, always engaging the ratchet and thus forcing gear 163 to turn with gear 162 and thus also holding bevel gears 168, 169 and 170 in actual inoperative position in regard to discs 182 and 182ª. The jaws at the right side of the figure shown in dash-and-dot lines as holding a condenser stack in their grip are thus swung in that same position to the left, as shown, and the jaws at the left, which are then in full open position, will then be brought in that same position, the upper arm over, and the lower arm under the edge of the turret 13 to the pocket 14 containing next condenser stack to be removed from turret 13. The full swing of the arms 172 and 172ª will be completed with the unmeshing of sector 157 with gear 162, coordinate with the motion of the turret 13 bringing the next completed condenser stack for removal from its pocket 14.

Sector 156 is now meshing again with gear 163 and the aforedescribed cycle of gripping a condenser stack and swinging it to the finishing device for completion begins over. The stack at the left is deposited on the turret 186 of Figures 1 and 18, on the termination of the movement of the disc 182ª under the influence of the intermittent gearing which, as explained, brings the jaws to the position shown in heavy lines to the left in Figure 15 and then forces the jaws to open into the positions shown in dash lines below and dash-and-dot lines above. When this has occurred the turret 186, Figure 18 steps away with the condenser stack. A further action is begun by the transfer device, which is the automatic pre-folding of the opposite projecting foil ends 185ª and 185ᵇ to prepare them for easy reception of the clips. This is effected as clearly shown in Figure 15 by abutments 185 on the lower jaws 178 which bend up foil ends 185ª at one end of the stack before it leaves the turret 13, as above stated. The opposite foil ends 185ᵇ are bent up at the moment the stack is laid upon turret 186. These ends 185ᵇ as the stack is laid down on the table 186, are turned up by brushing down against a part 199ᵇ to be described hereafter.

Reference is now had to Figures 17 and 18 which show in detail the method and mechanism for completing the condensers, particularly the steps of providing the condenser stack with the first clip. The mechanism for finally folding over the projecting foil ends 185ª after bending up consists of a finger 204 mounted for horizontal reciprocation and shown in Figures 18 and 17 at the extreme right. At the proper time this finger moves over to the left, passing over the foil ends 185ª and pressing them down upon the top surface of the stack 205. Simultaneously with this motion a clip 198 is slipped upon the opposite end of the stack and over the other foil tab 185ᵇ, which the clip presses down as it slides on. See Figure 18. The condenser is then ready for the next step, when it will be provided with the other clip and with eyelet rivets inserted for subsequent fastening.

The devices which carry the half-finished condensers through these and the remaining steps of finishing the condenser is shown fully in Figures 17 and 18, to begin with, and will now be described in detail.

The table, platform or turret 186 is mounted in a base frame 187 through the upper platform of which there extends upwardly a shaft 188. Extending horizontally through suitable bearings 187ª in said base 187 there is a shaft 189. On this shaft there is a series of gears of which 190 is adapted to supply motive power for said shaft, being operable through means not shown in the drawing. This gear 190, too, must of course rotate at the exact relative speed required, and it may be connected to the conveyor roller 88', the turret 13, or any other part, as may be desired or found convenient. On the shaft is also located a spur gear 191 for operating the riveting and all other means which perform an operation on the condenser at a later stage in the process. At the extreme inner end of the shaft 189 there is located a quadruple-section bevel gear 192 which meshes intermittently with gear 193 keyed at the lower end of shaft 188 for rotating the disc 194 together with the head 195 fixed to shaft 188. The disc 194 is divided into two gear sectors 201 and 202 which are directly opposite each other, each being slightly over one fourth the circumference of the total gear periphery. These sectors 201 and 202 mesh alternately with two slidable rack bars 196 and 197 on the table 186, the latter of which bars serves to press a clip 198, which has come down from a guideway or tubular magazine 199ª or, when this magazine has been emptied, from a magazine 199ᵇ, over the end of the assembled stack 205, as above described, this clip being forced into position by the head 197ª of the rack bar 197 which is of approximately the same width as the back of the clip. Both magazines 199ª and 199ᵇ are integral parts of the top cover plate 199 which is screwed onto the upper supporting member 209, on the table 186, the further object of the plate 199 being to hold in place disc 194 and the rack-bars 196 and 197 which slide in recesses of the said member 209 on the table 186; each having a spring 200 to pull it back out of operation when the gear sectors 201 and 202 get out of mesh with them.

The table 186 has its top surface flush with the top of the member 209 and has a central recess 186' in which this member is placed. At four points in the circumference marking the places where the stacks 205 are deposited, the table is provided with recesses 205ª which open through both the top and bottom of the table, these recesses being wide enough to receive the stacks in them. Each recess has an extension 205ᵇ which is extended in as far as the recesses 186', but is closed at the bottom 205ᶜ, and the recesses 205ª have shoulders 205ᵈ along their sides adjacent the bottom surface of the extensions 205ᶜ, which engage the side edges of the bakelite bottom covers 54' of the stacks as they are deposited in the recesses 205ª in turn, so that the stacks rest upon the shoulders 205ᵈ and do not fall through these recesses when the jaws 177 and 178 are withdrawn. The extensions 205ᵇ are about the same width as the front portions of the recesses between the inner edges of the shoulders 205ᵈ; that is, they are just wide enough to receive the clips 198. Hence, as the table rotates in the direction shown by the arrow in Figure 17, and as each extension comes under the magazine 199ᵃ, for example, a clip will drop into it and be carried around through another quarter turn till it comes under the magazine 199ᵇ. In this position, it will be pushed out by the rack bar 195, as described, over the adjacent end of the stack 205, but no clip from the magazine 199ᵇ will drop down at this time, because the arrival of a clip from the other magazine 199ᵃ prevents the magazine 199ᵇ from depositing a clip into position for being pushed upon the stack by the rack bar 197; and before the rack bar is withdrawn the continued rotation of the turret 186 will again bring a part of the top surface of the table under and close to the lower end of the magazine 199ᵇ, to keep the clips from coming out of the lower end. The top surface of the table 186, flush with the top of the member 209, will act the same way on the lower end of the magazine 199ᵃ, and thus clips cannot drop out of the magazines, except when one of the extensions 205ᵇ of the recesses 205ᵃ, is under them. Should the magazine 199ᵃ become empty, the clips in the magazine 199ᵇ will be drawn upon.

While the clip 198 is being slipped on one end of the condenser stack the foil tab 185ᵃ is being folded over as previously described by the finger 204, which, being actuated by the rack 196 to which it is attached, comes periodically into mesh with one of the gear segments 201 and 202; and at the same time when rack 197 comes into mesh with the opposite gear sector. Both racks are always engaged and released by the gear sectors at the same time. On the shaft 189 there is located another quadruple-section bevel gear 206 which meshes with gear 207 loosely mounted on the descending hub 209ᵃ of member 209 through which hub loosely passes the shaft 188. On the hub or sleeve 208 integral with the gear 207 there is fixed the table 186 which rotates therewith, and a thrust ball-bearing 208ᵃ encircles hub 209ᵃ between the base 187 and hub 208, to support the hub 208 and turret 186. Sleeve 209ᵃ, loose in the hub 208 enters and is fixed in a bearing in the top of base 181, so that member 209 with plate 199 is stationary as the table 186 revolves.

The head 195 has a function which is performed simultaneously with that of the rack-bars 196 and 197, this head being also operated by the intermittent sector gear 192, meshing with gear 193 keyed on the shaft 188, which supports head 195 above the disc 194.

Gears 189 and 193, are, as shown, in the proportion of two to one respectively; therefore, whenever one of the four segments of gear 192 (see Figure 18ᴮ) meshes with gear 193, at each quarter revolution of gear 189, gear 193 must turn one-half revolution. As shown in Figure 18ᴮ, the segments of gear 192 are placed at an angle of forty-five degrees to the segments of gear 206; in other words, the segments of those two gears are of such a dimension and located in such a position that as soon as a segment of one gear ceases to mesh with the gear it has just driven, the segment of the other gear located in the same quadrant comes into mesh with the gear it is to drive. By this arrangement, immediately at the end of each quarter revolution of table 186, head 195 and disc 194 start on their half revolution, after which table 186 follows with another quarter revolution, and so on. On the bottom of the head 195 there are located two diametrically opposite studs 210, which contact once in every half of a revolution with stud 211 on a horizontally reciprocating bar 212 which slides in the undercut guideway 213 in a vertical extension along one edge of the top cover plate 199. This bar has at its extremity a lever arm 214 extending in a direction at right angles thereto with a hinged and downwardly inclined extension 214ᵃ for contacting with a completely finished condenser as shown at the bottom of Figure 17 and also Figure 28. On each contact of one of the studs 210 with stud 211 during the rotation of the head 195, which takes place, as said, after each quarter revolution of table 186, the bar 212 with its hinged arm 214ᵃ is urged forward and a finished condenser stack is forced off the place on the table 186, which has been brought under this arm 214ᵃ by each quarter revolution of table 186 in the direction of the arrow in Figure 17. To the upright extension 213 of the frame 199 there is fixed a spring 215, the other end of which is attached to the reciprocating bar 212 at the end of the arm 214. This spring serves to draw the bar 212 back to inoperative position at the end of the stroke when a stud 210 of the head 195 in its rotation releases the stud 211 on the reciprocating bar 212.

When the table 186 is rotated to its following position ninety degrees around its circumference away from the device G, the second clip is pushed on the condenser stack 205 and two rivets are deposited in the openings in the stack which were punched in the bakelite covers by the punches 62 and 62′ (Figure 12), and in the foils by punches 123 and 124 (Figure 14), and in those which were already in the prepared mica sheets when passed through the rollers 66, 67, 68 and 69. The devices for these operations is shown in Figures 18, 19, 20, 21 and 22 to which reference is now had.

There is mounted in suitable bearings 186ᵇ on the frame 186ᵃ (Figure 19) beside the frame 187 for the table or turret 186, (see Figures 1 and 20), a shaft 215ᵃ upon which gear 216 rotates. This gear is driven from gear 191 mounted on the shaft 189, Figure 17, which is preferably parallel to shaft 215ª and consequently is driven by the same power source through gear 190. To the shaft 215ª there are fixed two bevel gears 217 and 218 by means of a pin 219. Further along the shaft 215ª there is fixedly mounted a cam 220 which co-acts with a vertical plunger rod 221 the operation of which will be described later. The gear 218 meshes with a second bevel gear 222 which is keyed to a shaft 223, vertically supported in a bearing 187ᶜ on the base 186ª. At the upper extremity of said shaft there is located a disc 224 having a crank pin 226 to which there is pivotally attached a crank bar 225. This bar actuates a longitudinally reciprocable bar 227, Figures 19 and 21. As disc 224 rotates the bar 227 is moved to the right into the position shown in dash and dot lines, Figure 19, with the result that a clip 228, similar to clips 198, which has been resting on the extreme left of the bar 227 is dropped behind said extreme left of the bar upon the top 229 of the base 186ª. Then when the bar 227 is pulled back to the left again into the position shown by full lines, by the connecting bar 225, the clip is pushed over the stack to embrace it and contact with down-folded foil ends 185ª.

The stacks 205 as they are each laid upon the table 186 receive clips 198 over their inner ends, that is to say, the ends nearer the center of the table, with projecting foils 185ᵇ. Thus, each stack has only one end remaining back from which the foil ends 185ª project still requiring a clip and such ends are the ends which are remote from the center and nearest the periphery of the table 186, and come nearest the center of table 234, Figure 19, when these ends are presented in position to receive the clips 228.

On the shaft 223 intermediate its length there is located an arm 230 having a stud 231 mounted thereon. This pin cooperates with a six-pointed star wheel 232, (Figures 19 and 21), as a simple means of revolving the table 234 in six steps, each two steps coinciding with a quarter revolution of the table 186, of Figure 17, and resulting from control of gear 216 by gear 191 of Figure 18. The table 234 is supported to turn on the frame 186ª, and disk 230 is affixed to the hub of a gear engaged by gear 217, said hub being free to turn in bearing 187ª.

The reason for the movement of two steps of table 234 for each quarter revolution by table 186 will be made clear. Fixed in the hub of the star wheel 232 is the hub or sleeve 233 of the rotating table 234, this hub turning in a central bearing in the base 186ª and the table 234 being supported by the top of the base 186ª. The bar 227 slides in a groove 227ª on the top face of the base 186ª and must be slotted at 229, so that the hub 233 does not interfere with its movement. On this table and supported by it is a stationary member 239 having a top 239ª and a bottom 239ᵇ with three rectangular openings in which are fixed three receptacles or magazines 235ª, 235ᵇ and 235ᶜ for the clips 228 to be fed to the stacks, the top and bottom having further five radially extending arms 236ª which support ten tubular containers 236 in all for the eyelet rivets. As the table 234 rotates as per arrow (Figure 20) in a step by step manner due to the Geneva movement, the clips periodically fall from the magazines into pockets 234ª, 234ᵇ and 234ᶜ of the table 234 ready in turn to be pushed upon the one end of the successive stacks as has already been described. They fall first from receptacle 235ª into pocket 234ª which, after having been emptied by bar 227 as explained, at the next one-sixth rotation of table 234 will have come under magazine 235ª. The end of the groove 227ª over which the pockets pass must be wide and deep enough to receive a clip and enable it to be engaged by the bar 227. At the same time pockets 234ᵇ and 234ᶜ have come under magazines 235ᵇ and 235ᶜ respectively. But, if magazine 235ª has not been emptied when they previously passed under it, they both consequently contain each a clip from said magazine 235ª, and no clip from the next magazine above them can therefore fall out of said magazine. The two magazines 235ᵇ and 235ᶜ are supplementary magazines for use in case the first one has been allowed to become empty. We may make the pockets 234ª, 234ᵇ and 234ᶜ deep enough for two clips, each and the operation will be the same. As each pocket 234ª, 234ᵇ and 234ᶜ come in turn, at intervals of a third of a revolution of the table 234 and a quarter revolution of the table 186, the clips 228 are pushed off one by one by the bar 227 and slipped upon the ends of the stacks which received no clip 198 from the magazine 199ª and 199ᵇ of the turret 186.

The table 186 is below the level of the rim of the table 234, so that the stacks 205 on this table 186 will pass beneath the rim of the table 234 at the point where the clips 228 are moved outward by the bar 227 to be slipped over the outer ends remote from the axis of the table 186 of the stacks 205. Thus the stacks are in proper position to receive the clips 228 actuated by the bar 227, and at the same time being under the rim of the table 234, suitable rivets carried by the table 234 can be passed through the holes in the stack to secure the parts of the stack and the rivets together.

Figure 22:
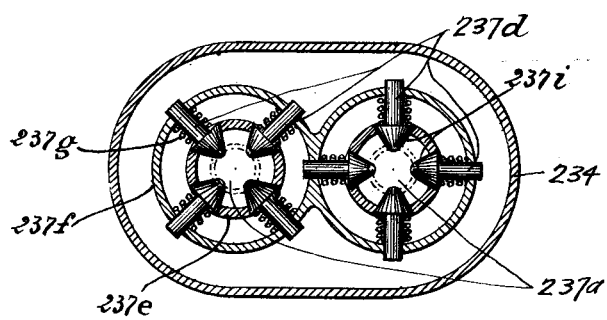
Figure 22 is an enlarged sectional plan view of the rivet inserter taken on line 22—22 of Figure 19.
Figure 21:
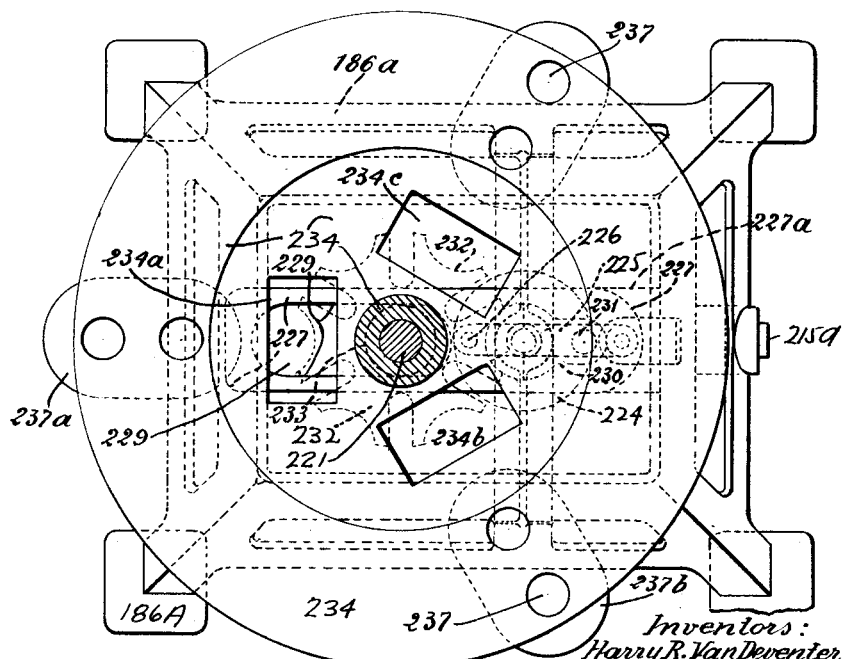
Figure 21 is a sectional plan view on line 21—21 of Figure 19.

In addition to the three clip magazines, table 234 is also provided with three pairs 237ª, 237ᵇ and 237ᶜ of equidistant guideway openings 237, the members of each pair being in radial alinement, for eyelet rivets used in fastening the parts of the condensers together. The construction is shown in Figures 19 and 22. Under each opening 237 is a ring 237$^e$ of the same inside diameter, coaxial with said opening, and this ring is surrounded by a larger ring 237$^f$. Mounted in apertures in these rings are radially arranged pins 237$^d$, having shouldered conical ends 237$^i$, and encircled by springs 237$^g$ abutting the rings 237$^f$ on the inside, and the shouldered heads 237$^i$, to push the conical ends into the bore through the inner rings 237$^e$. Each pair of rings 237$^f$ may be integral or united, and a flanged plate 237$^k$, Fig. 19 may engage the bottoms of the rings to hold them fast against the bottom of the table 234, this plate having openings to register with the rings 237$^e$, and the openings 237. Table 234 has a relatively thick hub 234$^h$, with the recesses or pockets 234$^a$, 234$^b$ and 234$^c$, resting on the base 186$^a$, but the rim 237$^n$ of the table is raised as shown in Figure 19, and through this rim the openings 237 are formed, with rings 237$^e$ and 237$^f$, and plate 237$^k$ secured to the under face of this rim, a little above the level of the bar 227. Of course, the apertures in the inner rings 237$^e$ are tapered to prevent heads 237$^i$ from projecting inward through the inner rings 237$^e$ too far, and the construction is the same for all the pairs 237$^a$, 237$^b$ and 237$^c$ of guideway openings 237.

The object of the yieldable restraining pins 237$^d$, is to hold the eyelet rivets $r'$ in a vertical position with their upper heads or ends flush with the upper face of the table 234, as shown in Figure 19, after they have fallen into the guideway openings 237 on the passage of these latter under the containers 236. Were it not for these pins with conical heads the rivets, on account of their upper flanged rims, would not take in the guideway openings the necessary vertical position, which they must have in order to be in exact line with the holes of the condenser stacks into which they are to be pushed by two pin plungers 237$^p$ mounted on the vertically reciprocating horizontal arm 238, fixedly mounted on shaft 221.

This arm 238 consists of a flat piece of metal of the form shown in Figures 19 and 20. It passes through a slot cut in the vertical plunger rod 221 and a slot 238$^a$ of the same thickness in the central hub 239$^c$ of the stationary member 239 through which passes the shaft 221, and on which are fastened the top 239$^a$ and bottom 239$^b$ of member 239. Hub 239$^c$ rests in a recess cut in the upper hub extension 234$^i$ of hub 234$^h$ of table 234.

It will be noted that shaft 221 is held in a non-rotating position by means of the flat roller 221$^a$ pinned to its lower end in a deep recess, and in continual engagement within a deep peripheral groove 220$^a$ of the cam 220. This shaft, by its arm 238, also holds member 239 against rotation, with its magazines for the clips and rivets.

Shaft 221 being thus non-revolving, arm 238 holds plungers 237$^p$ always axially over the guideway openings 237 whenever table 234 swings into position for providing a condenser stack with the last clip and with two eyelet rivets; one through each clip on the two ends of the stack 205. By the same means the member 239 and the magazines for the clips and the rivets are held stationary. Arm 238, however, being fixed on shaft 221 goes up and down with the shaft whenever this is actuated by cam 220. These up and down movements of the shaft 221 are so co-ordinated that arm 238 is in its upper position the greater part of the revolution of the cam, which provides a short downward and rapid return upward stroke immediately after the clip 228 has been pushed over the stack by the stroke of bar 227, during the space of time elapsing after every second step and the following one of the rotation of table 234. On the descending stroke of the rod 221 and arm 238, the plunger pins 237$^p$ strikes the eyelet rivets downwards into the holes of the stack, forcing the conical pins 237$^d$ to recede for the passage of the rivets and their flanged heads. To make the down stroke of the rod 221 forcible enough, a spring S may be put on its lower end between the hub 233 and the projecting ends of the pin 221$^b$ of roller 221$^a$.

Next after the just described operations have been accomplished the assembled stack is carried under the riveter shown in detail in Figures 23, 24, 25, 26 and 27. This riveting mechanism is mounted upon a frame 240, beside the base 187, and in line with the stack transferring device G, the table 186 being between, the base 240 having at its central portion two horizontal bearings 241. In the bearings there is supported a shaft 242 which has keyed at its extremity adjacent table 186 an arm 243 cooperating in turn with the four blocks 245 pivoted to the lower face of the table 186 and which are held in position, as shown, by the springs 244 and the pivot pins 245$^c$. (See Figure 18.) These blocks have each a protruding lug 245$^a$ which on contacting with the arm 243 rotates the shaft 242 and thus throws the loosely mounted sliding member of the clutch 246 (Figures 24 and 26) into engagement with the other non-sliding but continuously revolving member 246$^a$. The member 246 has a groove 246$'$, receiving studs 242$''$ at the ends of arms 242$'$, fixed on shaft 242.

Shaft 242$^a$ is driven by means of a sprocket wheel 242$^b$ from a source of power not shown. The sprocket is fastened to a flywheel 242$^c$ which, as is customary in punching presses, is provided to give the necessary momentum at the moment of punching, but in the present case, at the moment of riveting. The fly wheel and the sprocket and the clutch member 246$^a$ are integral and are loosely mounted on shaft 242ª. Clutch member 246 has a long sleeve 246″ which slides in the hub 249ª of the sprocket 249, which rotates in a bearing 249ᵇ of the right upright wall of frame 240, (Figure 24) and in which the sleeve 246″ is slidingly keyed. Therefore, whenever clutch member 246 engages the member 246ª, it is made to revolve and to entrain with it sprocket wheel 249, which actuates by means of chain 247 the larger sprocket wheel 248 keyed on shaft 250 which is supported in bearings 250ª of the two vertical walls of supporting frame 240. On shaft 250 are keyed two cams 252 and 253 which operate the riveter arms 256 and 254 respectively through their rear extending arms 256ª and 254ª, and which are supported by the shafts 257 and 255 respectively and revolving in bearings 255ª and 257ª respectively in the frame 240. Rear arm 256ª of the riveter arm 256 is not directly actioned by its cam 252. It receives its riveting pressure indirectly through another arm 270 which is loosely mounted adjacent to it on the same shaft. These arms have laterally horizontal extensions 270ª and 270ᵇ respectively, directly one above the other held apart by a helical spring 268. This spring is to prevent the breaking of one or the other riveting levers if for some reason or another, such as a too long rivet, or a too thick condenser stack, some foreign incompressible material or article comes between the riveter members at the moment of operation. The action of cam 252 on arm 270 would in such a case, continue as in normal action but the extra strain that would result from two non-flexible arms and which might result in the breaking of one of the arms, or the breaking of one or the other driving chains, would therefore be exerted on spring 268. Lever arms 256ª and 270 are prevented from separating too far apart by means of a loop 270ᶜ affixed to arm 270 and girdling the arm 256ª. Receiving the upper riveter arm 254 in a recess therein is a punch block 258 held up out of operative position by the springs 259 attached to the frame 240. The block 258 has at its base two projecting abutments 260 which press on the reciprocating plungers 261 which in turn press down on the rivets in each assembled condenser on the table 186. These plungers are also supported in a horizontal bar 263 of frame 240, having openings for the plungers. The plungers have collars 261ª, and the openings have shoulders 263ª at their lower ends, so that springs 264 in the openings around the plungers can seat against the collars 261ª and shoulders 263ª. Below the table there is mounted a block 265 having anvils or pointed expanding dies 266 therein to cooperate with the lower ends of the rivets r′ of stacks 205 to bend the said rivet ends over to engage the clips and secure the parts of the condenser together. This block receives the end of the arm 256 in an opening therein, and is actuated by this arm and by the cam 252. Springs 267 fixed to the block 265 and the frame, tend to pull the block downward. The action of both springs 259 and 267 on their respective blocks 258 and 265 indirectly holds the rear arms 254ª and 270 of the respective actuating arms 254 and 256 in permanent contact with the face of their respective cams 253 and 252. As the two cams urge the lever arms 254 and 256 towards each other, the parts 260 force down the plungers 261, and the dies 266 are raised and the lower ends of the rivets expanded or flared out. The upper ends of the rivets being already flanged, the condenser parts are all secured firmly together, as is easily understood.

The actual stack riveting operation is as follows: When a condenser stack is carried at each quarter revolution of the table 186 under the riveting arms, the table 186 with the stack passing between blocks 263 and 265, slightly ahead of the end of quarter turn, the pivot block 245 under table 186 and radially at the rear of the stack to be riveted strikes with its protruding lug 245ª arm 243 which then, as explained, engages both clutch members 246 and 246ª, and thus sets cams 252 and 253 in motion for one single whole revolution. This single revolution brings the riveter arms towards one another and then automatically separates both clutch members by means of releasing parts, which will be presently described. A flat bar 290 of rectangular prismatic form, with a rounded forward end and with an upwardly extending rear end 291, slides in a bracket 292 attached to the right side wall of the base 240 by means of screws 293. The rounded forward end of bar 290 is normally held out of the passageway of pivot-blocks 245 by means of a tension spring 294 attached to the frame wall, and a pin 295 extending out of bar 290 into a recess or slot in the frame 240 limits the rearward slide of the bar. A stud 296 is screwed into the inner face of the sprocket wheel 248. At each revolution of the wheel stud 296 strikes the rear face of the upper extending rear end 291 of the bar 290 and forces it outward. The rounded front end of this bar then strikes the end 245ᵇ, Figure 18 of the pivoting block 245, which, being thus forced to swing around its pivot 245ᶜ, forces lug 245ª out of contact and of the way of lever 243 which then, by the pull of spring 272 attached to the base, snaps both members 246 and 246ª of the clutch out of engagement, as per Figure 26. This operation also permits the next quarter turn of the table 186 which will bring another condenser stack forward under the riveting arms.

The assembled condenser is discharged from the table 186 at the end of a full revolution by the actuating arm 214ª of bar 212 previously described and shown in Figures 17 and 28, into a vat 273 in which it is carried through an impregnating and waterproofing bath as shown in Figure 28. The condensers are carried herein along a series of belts or chain conveyors 274, 275 and 276 one located above the other, independent in operation, travelling in opposite directions, and so arranged that one protrudes beyond the other at alternate ends. Thus the condensers fall from the table 186 upon conveyor 274, and upon travelling the length of the topmost belt 274 drop from the end of that belt to the belt 275 beneath, which is travelling in the opposite direction; and the process is repeated until the condenser has reached the delivery end of the lowermost belt 276, when it is picked up and carried out of the vat by a conveyor 276ᵃ of well known arrangement which discharges the impregnated condensers down the slide way 278. The vat may have its contents heated, if desired by any suitable electric heater 279 and may also be arranged so that the impregnation may be carried out in a vacuum, the mechanism for which process is not here shown.

On leaving the delivery end of the lowermost belt 276, the condensers drop upon an inclined way 277, from which they are picked up by the conveyor 276ᵃ. This conveyor runs vertically on sprockets 279 mounted on shafts 280 and the conveyor comprises loops at each side, made up of connection links 281, the adjacent ends of the links being united by the ends of cross-bars 282 as pivots. On these cross-bars, which are round, are sleeves or bushings 283 which serve as bearings to mount, in a rotatable manner on the bars, the flat carriers 284. The sleeves 283 are secured to these carriers at points on one side of the middle, so that when one part of the belt is travelling downward, the carriers will fall by their own weight until they are in nearly vertical position, with their free or overbalanced ends lowermost, as indicated at the left of the belt in Figure 28. When these carriers reach the bottom sprockets and start on their upward travel, they pick up and bear the condensers on the inclined way 277 with them. Each of these carriers has a projection 285 extending from one face thereof adjacent the sleeve 283, so that, as each condenser is picked up, and the carrier assumes the position shown at the right of the belt in Figure 28, the condenser cannot move down on the carrier past the stop 285. The condenser thus rests upon the overbalanced ends of the carriers; while the opposite ends slide along a guide 286, having bearings to enable it to be mounted upon the two shafts 280, at the right of the conveyor. This guide prevents the overbalanced ends of the carriers bearing the condensers from dropping, and as stated, the condensers are held against sliding down the carriers against the guide 286 by the stops 285. As soon as the carriers reach the top of the conveyor, they discharge the condensers on the slideway or delivery surface or chute 278.

The treated condensers are now subjected to a centrifugal drying process carried out preferably in an open-ended wire or metal cage 280 of cylindrical form, the upper end receiving the condensers from the delivery chute 278. This cylinder is shown in Figure 29 as suitably inclined and rotated by a driven gear 281 integral with a worm gear which meshes with a worm wheel 282. This worm wheel is located on shaft 283 extending along the bottom of the cylinder and having at its extremities grooved rollers 285, receiving annular ribs 284 fixed on the ends of cage 280 to prevent downward sliding motion of the cage. The finished condensers are discharged dried from the lower end of the cylinder ready for testing and packing.

The shaft of the gear 70 being driven at the desired speed from any convenient source of power, and the drum 88 being geared to this shaft, the conveyor belt 81ᵃ runs at the speed required; and through the connection between the shaft 88ᵃ and the shaft 28ᶜ, the inner turret 15 is kept moving; and as the inner turret 15 moves, it operates the devices B to distribute mica sheets upon the outer turret 13. It will be noted with reference to Figures 2, 3, 3ᴬ and Figure 4, that, as the turret 13 is shifted two spaces or pockets, while the inner turret 15 rotates one-half revolution, the movement of the outer turret (after each condenser stack in the process of formation receives a mica sheet from the inner turret) to bring each condenser stack into position to receive a sheet of foil, will take place just after the disc 51 is withdrawn by the spring 51′. That is to say, the return of the disc 51 under the influence of the spring 51′ causes the sheets of mica to be transferred from the inner turret 15 to the outer turret 13 quickly, and then the outer turret 13 is shifted to carry the pockets forward under the foil laying devices C, because the crank arm 23 is timed to turn the spur gear 24 to effect motion of the outer turret 13 in this way. On the return movement of the disc in the opposite direction, further motion of the outer turret 13 takes place to bring the condenser stacks in formation into position to receive more sheets of mica. The shafts 59 and 128 operating the cover feeding devices D and D′ are also made to move in synchronism with the turret 13; likewise the gear 149 operating the device G to transfer the condenser stacks from the turret 13 to be furnished with clips and rivets, and the gears 190 and 216 are likewise operated at the required speed by proper connections to run at the rate proportionate to the drum 88′, and thus also the clip supplying devices and rivet attaching devices, as well as the delivering arm 214ᵃ all work in synchronism to construct and finish the condensers and deliver them to the impregnating device J and delivering cylinder K.

It is to be noted that the parts 110 normally occupy the positions shown in Figure 8, being held in such position by a spring 110ª which can be fastened to the lug 108 or any other convenient part and made to bear down upon the right end of these blocks or parts 110.

The cylinder K is hollow and it is received in a frame 286 the sides of which extend partly up the sides of the cylinder with the shaft 283 extending through the middle of the frame in the position shown in Figure 29. At the upper corners of each side at the ends thereof, the frame will carry rollers 287 to engage the faces of the ribs 284 and thus hold the cylinder against sliding downward in the frame 283, these rollers allowing the cylinder to rotate freely as the shaft 283 revolves. The weight of the frame may be supported on the rollers 285.

It is, of course, obvious that various changes and modifications may be made to the details of construction and the steps of the method of production of condensers above described without departing from the spirit of this invention set forth in the appended claims.

We claim:

1. Apparatus for producing condensers comprising parts for forming the stack of the condenser by combining alternate layers of metal foil and insulation, parts for disposing cover plates on the opposite faces of said stack, parts for bodily moving the stack, parts for attaching clips to the opposite ends of said stack, parts for securing said clips to the stack by riveting, and parts for impregnating and drying the condenser, together with connections for controlling and driving said parts to perform their functions in the order required.

2. Apparatus for producing condensers comprising a support, a device for feeding insulation to said support, a second support, one or more devices for feeding sheets of conductive material to the second support, and one or more devices for transferring the insulation from the first support to the second to cooperate with said sheets of conductive material.

3. Apparatus for producing condensers comprising a support, a device for feeding sheets of insulation to said support, a second support, a device for feeding sheets of conductive material to the second support, one or more devices for transferring the sheets of insulation from the first support to the second to cooperate with the sheets of conductive material, and a transferring device for removing the sheets of insulation and conductive material from the second support.

4. Apparatus for producing condensers comprising a support, a device for feeding insulation to said support, a second support, one or more devices for feeding sheets of conductive material to the second support, and one or more devices for transferring the insulation from the first support to the second to cooperate with said sheets of conductive material, said supports being movable.

5. Apparatus for producing condensers comprising a support, a device for feeding sheets of insulation to said support, a second support, a device for feeding sheets of conductive material to the second support, one or more devices for transferring the sheets of insulation from the first support to the second to cooperate with the sheets of conductive material, and a transferring device for removing the sheets of insulation and conductive material from the second support, said supports being movable.

6. Apparatus for producing condensers comprising a support, a device for feeding insulation to said support, a second support, one or more devices for feeding sheets of conductive material to the second support, and one or more devices for transferring the insulation from the first support to the second to cooperate with said sheets of conductive material, said supports being movable and said apparatus comprising mechanism for moving the supports at different rates of speed.

7. Apparatus for producing condensers comprising a support, a device for feeding sheets of insulation to said support, a second support, a device for feeding sheets of conductive material to the second support, one or more devices for transferring the sheets of insulation from the first support to the second to cooperate with the sheets of conductive material, and a transferring device for removing the sheets of insulation and conductive material from the second support, said supports being movable and said apparatus comprising mechanism for moving the supports at different rates of speed.

8. Apparatus for producing condensers including a support whereon layers of insulation and conductive material are piled in succession to form a stack, means for riveting said stack, and means for automatically transferring the stack from the support to the riveting means.

9. Apparatus for producing condensers including a support whereon layers of insulation and conductive material are piled to form a stack, means for putting clamps on said stack and riveting same together, and means for automatically transferring the stack from said support to said first named means.

10. Apparatus for producing condensers comprising a movable support for receiving sheets of insulating material, a device for feeding said insulating material to said support in synchronism with the motion thereof, and connections controlled by said device for stopping the said support whenever said device fails to supply said insulation at the required instant.

11. Apparatus for producing condensers comprising a device for feeding sheets of insulation to said apparatus, and testing mechanism for delivering insulation to said device and comprising receptacles and means for diverting insulation of incorrect size into said receptacles.

12. Apparatus for producing condensers comprising a movable support, a device for feeding insulation to said support, mechanism for actuating the support, and means comprising electrical connections and a circuit breaker controlled by said device for preventing movement of said support whenever the device fails to deliver insulation thereto at the required instant.

13. Apparatus for producing condensers comprising a support whereon the body of the condenser is formed, and a device for removing said body from said support, said device comprising jaws to seize the said body, and levers to operate said jaws and swing the same towards and from said support.

14. Apparatus for producing condensers comprising a support for receiving sheets of insulation and a device comprising one or more guideways and carriages for removing said insulation from said support through said guideways, and means for reciprocating said carriages.

15. Apparatus for producing condensers comprising a support for receiving sheets of insulation and a device comprising one or more guideways and carriages for removing said insulation from said support through said guideways, and means for reciprocating said carriages, said carriages having projections to engage the insulation and propel it along the guideways, and said guideways having means to engage said carriages and lift same clear of said insulation on the reverse movement of said carriages.

16. Apparatus for producing condensers comprising a pair of concentric rotating turrets, gearing and connections for revolving said turrets, a plurality of devices for supplying sheets of conductive material to one of said turrets at different points on same, and a plurality of devices for transferring insulation from the other turret to the turret carrying the sheets of conductive material, so that one of said sheets of insulation is placed upon each of said sheets of conductive material at every transferring operation.

17. Apparatus for producing condensers comprising a pair of rotatably mounted turrets, a plurality of guideways extending from one turret to the other, a carriage in each of said guideways, arms connected to each of said carriages and a single member to which said arms are connected to operate said arms and reciprocate said carriages simultaneously.

18. Apparatus for producing condensers comprising a movable support, a device for feeding sheets of insulation to said support, mechanism and connections for moving said support, and an electrical circuit breaker controlled by said insulation, arranged to interrupt the movement of the support whenever the feeding device fails to supply said insulation.

19. Apparatus for producing condensers comprising a movable support having a pocket, a guideway through which insulation is passed to said pocket, a cover plate for said pocket, and resiliently mounted means carried by the cover plate for engaging insulation in said pocket.

20. Apparatus for producing condensers comprising a movable support having a pocket for receiving insulation, a guideway through which insulation is passed to said pocket, a cover plate for said pocket and a tripper for raising said plate to uncover said pocket and permit insulation to be admitted thereto.

21. Apparatus for producing condensers including a support whereon the body of the condenser is formed, a device for adding clips to said condenser, means for automatically transferring the condenser from the support to the device for adding clips, and means carried by said last named device for folding over upon the exterior of the condenser protruding ends of sheets of conducting material forming part of said condenser.

22. Apparatus for producing condensers comprising a device for putting clips upon the opposite ends of said condensers, said device having one or more magazines wherein said clips are stored, means for delivering said clips, and means for removing said condensers from said device.

23. Apparatus for producing condensers comprising a device for folding down upon the exterior of the condenser the ends of sheets of conducting material projecting therefrom, one or more magazines for supplying a clip to be placed upon one end of the condenser, and a second device for putting a clip upon the other end of the condenser and supplying rivets to bind the parts of the condenser together, said first-named device having means for delivering said condenser.

24. Apparatus for producing condensers comprising a device for supplying clips to be attached to said condenser, said device comprising a magazine wherein said clips are stored, a reciprocable part to cooperate with the magazine to fold down upon the exterior of the condenser the ends of conductive sheets projecting therefrom, and a second reciprocable part for pushing said condenser off said device.

25. The apparatus according to claim 24 wherein said device comprises gearing connected to said reciprocable parts to operate same intermittently and in succession.

26. Apparatus for producing condensers comprising a part having one or more magazines wherein clips are stored, and additional magazines to receive rivets, means for causing said clips, one by one, to engage one end of the condenser, and means for causing said rivets to engage said condenser.

27. The apparatus according to claim 26 wherein said device comprises gearing for intermittently actuating said means in succession.

28. Apparatus according to claim 26 wherein the means for causing the rivets to engage the condenser comprises a plunger rod, a cam and spring for operating said plunger rod, an arm on said plunger rod, and pins carried by said arm.

29. Apparatus for producing condensers comprising a rivet supplying device containing a ring through which a rivet can be passed, and spring pressed pins projecting through said ring for yieldably engaging a rivet in said ring to hold same in place but permitting the rivet to be pushed through the ring.

30. Apparatus for producing condensers comprising a rotatable table, a frame work supporting the table, a reciprocable bar, and reciprocable plunger, connections for intermittently operating the table, bar and plunger, a stationary member above the table, and one or more magazines for storing clips and rivets supported by said member.

31. Apparatus for producing condensers comprising a riveting device and a device for fastening said rivets, said last-named device comprising plungers and dies for fastening said rivets, arms for actuating said plungers and dies, cams for actuating said arms, a clutch to connect the cams to a source of power, and parts controlled by the device for supplying rivets to connect and disconnect said clutch.

32. Apparatus according to claim 31 wherein said parts for connecting and disconnecting said clutch comprise an arm, blocks mounted upon said device for supplying rivets for periodically engaging said arm to throw in the clutch, and a bar to put said blocks out of engagement with said arm to enable the clutch to be disconnected.

Signed at New York, in the county of New York and State of New York, this 23d day of July, A. D. 1924.

CHARLES HORTON.
HARRY R. VAN DEVENTER.
ANATOLE C. HEINY.